United States Patent
Porta Garcia et al.

(10) Patent No.: US 9,062,136 B2
(45) Date of Patent: Jun. 23, 2015

(54) POLYMERIZABLE ALKYLIDENE-1,3-DIOXOLANE-2-ONE AND USE THEREOF

(71) Applicant: BASF SE, Ludwigshafen (DE)

(72) Inventors: Marta Porta Garcia, Mannheim (DE); Martine Weis, Mannheim (DE); Andreas Lanver, Mannheim (DE); Mathieu Blanchot, Ludwigshafen (DE); Aaron Flores-Figueroa, Mannheim (DE); Rainer Klopsch, Worms (DE); Christina Haaf, Hemsbach (DE); Olaf Kutzki, Mannheim (DE)

(73) Assignee: BASF SE, Ludwigshafen (DE)

( * ) Notice: Subject to any disclaimer, the term of this patent is extended or adjusted under 35 U.S.C. 154(b) by 270 days.

(21) Appl. No.: 13/853,552

(22) Filed: Mar. 29, 2013

(65) Prior Publication Data

US 2013/0331532 A1    Dec. 12, 2013

Related U.S. Application Data

(60) Provisional application No. 61/617,062, filed on Mar. 29, 2012.

(51) Int. Cl.
| | |
|---|---|
| *C08L 63/02* | (2006.01) |
| *C09J 163/02* | (2006.01) |
| *C09D 163/02* | (2006.01) |
| *C08F 24/00* | (2006.01) |
| *C08F 222/10* | (2006.01) |
| *C08F 220/40* | (2006.01) |
| *C08F 220/18* | (2006.01) |

(52) U.S. Cl.
CPC .............. *C08F 24/00* (2013.01); *C08F 222/10* (2013.01); *C08F 220/18* (2013.01); *C08F 220/40* (2013.01)

(58) Field of Classification Search
CPC ...... C08F 220/40; C08F 222/10; C08F 24/00; C08F 220/18
USPC .......................................... 526/269; 549/229
See application file for complete search history.

(56) References Cited

U.S. PATENT DOCUMENTS

| | | | |
|---|---|---|---|
| 3,082,216 A | 3/1963 | Dimroth et al. | |
| 5,240,835 A | 8/1993 | Pettrone et al. | |
| 2003/0100687 A1 | 5/2003 | Ohrbom et al. | |
| 2011/0014569 A1* | 1/2011 | Kasahara et al. | .......... 430/270.1 |
| 2011/0306702 A1 | 12/2011 | Klopsch et al. | |
| 2012/0123136 A1 | 5/2012 | Miller et al. | |
| 2013/0072595 A1 | 3/2013 | Yu et al. | |
| 2013/0079436 A1 | 3/2013 | Klopsch et al. | |
| 2013/0085209 A1 | 4/2013 | Klopsch et al. | |

FOREIGN PATENT DOCUMENTS

| | | |
|---|---|---|
| CA | 1303051 | 6/1992 |
| DE | 1 064 938 | 9/1959 |
| DE | 1 098 953 | 2/1961 |
| DE | 1 176 358 | 8/1964 |
| DE | 26 39 083 A1 | 3/1978 |
| DE | 27 37 951 A1 | 3/1979 |
| DE | 3433403 A1 | 3/1986 |
| DE | 10 2009 003 035 A1 | 11/2010 |
| EP | 0 622 378 A1 | 11/1994 |
| EP | 0 837 062 A1 | 4/1998 |
| JP | 2006-52244 A | 2/2006 |
| JP | 2006-137733 A | 6/2006 |
| JP | 2008-222619 A | 9/2008 |
| WO | WO 96/26224 A1 | 8/1996 |
| WO | WO 97/23516 A1 | 7/1997 |
| WO | WO 03/048215 A1 | 6/2003 |
| WO | WO 2004/005088 A1 | 1/2004 |
| WO | WO 2011/157671 A1 | 12/2011 |
| WO | WO 2012/065879 A1 | 5/2012 |
| WO | WO 2013/041398 A1 | 3/2013 |
| WO | WO 2013/041425 A1 | 3/2013 |
| WO | WO 2013/050311 A1 | 4/2013 |

OTHER PUBLICATIONS

Yoshihito Kayaki, et al., "Stereoselective Formation of α-Alkylidene Cyclic Carbonates via Carboxylative Cyclization of Propargyl Alcohols in Supercritical Carbon Dioxide", Journal of Organic Chemistry, 2007, pp. 647-649.
Yoshihito Kayaki, et al., "N-Heterocyclic Carbenes as Efficient Organocatalysts for $CO_2$ Fixation Reactions", Angewandte Chemistry, 2009, pp. 4258-4261.
Wataru Yamada, et al., "Silver-Catalyzed Incorporation of Carbon Dioxide into Propargylic Alcohols", European Journal of Organic Chemistry, 2007, pp. 2604-2607.
Huan-Feng Jiang, et al., "Reusable Polymer-Supported Amine-Copper Catalyst for the Formation of α-Alkylidene Cyclic Carbonates in Supercritical Carbon Dioxide", European Journal of Organic Chemistry, 2008, pp. 2309-2312.
Andrea Buzas, et al. , "Gold(I)-Catalyzed Formation of 4-Alkylidene-1, 3-dioxolan-2-ones from Propargylic tert-Butyl Carbonates", Organic Letters, vol. 8, No. 3, 2006, pp. 515-518.
Bungo Ochiai, et al., "Synthesis and Crosslinking of Oligo(carbonate-ketone) Obtained by Radical Polymerization of 4-methylene-5,5-dimethyl-1,3-dioxolan-2-one", Journal of Network Polymer, vol. 26, No. 3, 2005, pp. 132-137.
Iwhan Cho, et al., "Radical polymerization of 4-methylene-1,3-dioxolan-2-one and its hydrolyzed water-soluble polymer", Makromol. Chem., Rapid Communication, 1989, pp. 453-456.
International Search Report issued Jun. 5, 2013 in PCT/EP2013/056716 (with English translation of categories of cited documents).

* cited by examiner

*Primary Examiner* — Ling Choi
*Assistant Examiner* — Chun-Cheng Wang
(74) *Attorney, Agent, or Firm* — Oblon, McClelland, Maier & Neustadt, L.L.P.

(57) ABSTRACT

Polymerizable alkylidene-1,3-dioxolan-2-one monomers, a process for preparation of polymerizable alkylidene-1,3-dioxolan-2-one monomers, and the use thereof for preparation of polymers. The invention also relates to the homopolymers and copolymers obtained by homopolymerization or copolymerization of alkylidene-1,3-dioxolan-2-one monomers and to the use thereof as a component in 2K binder compositions.

19 Claims, No Drawings

POLYMERIZABLE ALKYLIDENE-1,3-DIOXOLANE-2-ONE AND USE THEREOF

The present invention relates to polymerizable alkylidene-1,3-dioxolan-2-one monomers, to the preparation thereof and to the use thereof for preparation of polymers. The invention also relates to the homo- and copolymers obtainable by homo- or copolymerization of alkylidene-1,3-dioxolan-2-one monomers and to the use thereof as a component in 2K binder compositions.

Polyurethanes (PUs) find use in countless fields, for example the production of foams, paints, coatings and adhesives. A common feature of all polyurethanes is that they are prepared by polyaddition of polyamines or polyols onto polyvalent isocyanates. Skilful selection of the polyamine or polyol component allows control of the profile of properties of the polyurethane obtained.

A disadvantage is found to be the high reactivity of the polyvalent isocyanates, which leads to a high moisture sensitivity, which is exploited for the production of foams, but is undesirable for other applications, for example coatings. Although polyvalent isocyanates are storable over a prolonged period under anhydrous conditions, the reaction with water sets in the course of curing, and so it is necessary to work under very dry conditions. Over and above the moisture sensitivity, the aromatic isocyanates (MDI, TDI) in particular have a tendency to discoloration. Another problem is the health concerns associated with some diisocyanates. For instance, it is known that diisocyanates can trigger allergies on skin contact or inhalation. For this reason, oligomers of diisocyanates have been developed, which are easier to handle due to their lower volatility. Nevertheless, there is fundamentally a requirement for alternatives to the polyisocyanates known from the prior art.

Alkylidene-1,3-dioxolan-2-ones, which are also referred to hereinafter as exo-vinylene carbonates, have been the subject of various descriptions in the literature, for example in DE 1098953, DE 3433403, EP 837062, JP 2006137733, JP 2008222619, J. Org. Chem. 2007, 72, 647-649, Angew. Chem. 2009, 121, 4258-4261, Eur. J. Org. Chem. 2007, 2604-2607, Eur. J. Org. Chem. 2008, 2309-2312, Org. Lett. 2006, 8, 515-518. Alkylidene-1,3-dioxolan-2-ones are proposed therein as synthesis units for the production of active ingredients and effect substances.

WO 2011/157671 describes the use of alkylidene-1,3-dioxolan-2-ones together with aminic hardeners as additives in epoxy resin compositions.

WO 96/26224 describes the copolymerization of 4-vinyl-1,3-dioxolan-2-ones with ethylenically unsaturated comonomers. The polymers obtained have 1,3-dioxolan-2-one groups and are used together with amino-functional crosslinkers for production of coatings.

US 2003/100687 discloses 4-(meth)acryloxyalkyl-1,3-dioxolan-2-ones which are polymerized with ethylenically unsaturated comonomers to give copolymers having 1,3-dioxolan-2-one groups bonded via alkyloxycarbonyl units. The polymers are reacted with aminic compounds to obtain graft polymers having urethane and hydroxyl groups. The graft polymers are used in coating materials.

However, the reactivity of the polymers which have 1,3-dioxolan-2-one groups and are known from the prior art is unsatisfactory, especially in the reaction with amines. In addition, the reaction of 1,3-dioxolan-2-ones with, for example, amines or alcohols forms hydroxyl groups, which can be found to be disadvantageous in various applications.

It has now been found that, surprisingly, the compounds of the formula I which are described in detail hereinafter and have an alkylidene-1,3-dioxolan-2-one group and a further ethylenically unsaturated double bond can be free-radically polymerized while conserving the alkylidene-1,3-dioxolan-2-one group. This is surprising since there are various descriptions in the literature of polymerization of the methylene group in methylene-1,3-dioxolan-2-ones under free-radical conditions; see, for example, Journal of Network Polymer, Japan 2005, 26, 132-137, Makromol. Chem., Rapid Commun. 1989, 10, 453-456.

Accordingly, a first aspect of the invention relates to the compounds of the general formula I defined below

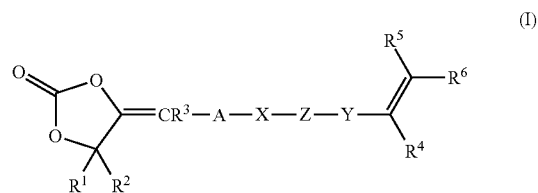

in which
$R^1$ and $R^2$ are each independently hydrogen, $C_1$-$C_6$-alkyl, $C_1$-$C_4$-alkoxy-$C_1$-$C_4$-alkyl, $C_5$-$C_6$-cycloalkyl, phenyl or phenyl-$C_1$-$C_4$-alkyl;
$R^3$ is hydrogen, $C_1$-$C_6$-alkyl, $C_1$-$C_4$-alkoxy-$C_1$-$C_4$-alkyl, $C_5$-$C_6$-cycloalkyl, phenyl or phenyl-$C_1$-$C_4$-alkyl, where $R^3$ is especially hydrogen;
$R^4$ is hydrogen, $C_1$-$C_4$-alkyl, $CH_2COOR^8$, phenyl or phenyl-$C_1$-$C_4$-alkyl;
$R^5$ and $R^6$ are each independently hydrogen or $C_1$-$C_4$-alkyl, or one of the $R^5$ and $R^6$ radicals may also be COORS or $CH_2COOR^8$;
A is a chemical bond or $C_1$-$C_4$-alkanediyl, where A is especially $C_1$-$C_4$-alkanediyl;
X is O or $NR^7$;
Z is a chemical bond, $PO_2$, $SO_2$ or C=O, where Z is especially C=O;
Y is a chemical bond, $CH_2$ or $CHCH_3$, where Y is especially a chemical bond;
$R^7$, if present, is $C_1$-$C_6$-alkyl;
$R^8$, if present, is hydrogen or $C_1$-$C_6$-alkyl.

The homo- or copolymers obtained in the homo- or copolymerization of the compounds of the formula I generally have several functional groups of the formula I' bonded to the polymer backbone formed from carbon atoms.

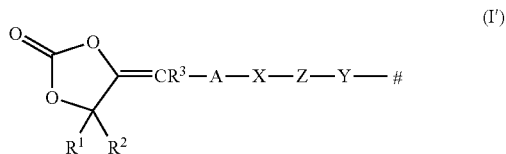

In formula I', # represents the bond to the polymer backbone and $R^1$, $R^2$, $R^3$, A, X, Z and Y are each as defined here and hereinafter. Such polymers have a high reactivity compared to compounds having functional groups F from the group of the aliphatic hydroxyl groups, primary and secondary amino groups, phosphine groups, phosphonate groups and mercaptan groups, without having the disadvantages associated with isocyanates. They are therefore particularly suitable as a replacement for polyfunctional isocyanates in numerous applications, especially for 2K binders. They therefore likewise form part of the subject matter of the present invention.

Here and hereinafter, the prefix "$C_n$-$C_m$—" used to define substituents and chemical compounds states the number of possible carbon atoms of the substituent or compound.

Unless stated otherwise, the following general definitions apply in the context of the present invention for the terms used in connection with the substituents:

"Alkyl" is a linear or branched alkyl radical having, for example, 1 to 4 ($C_1$-$C_4$-alkyl), 1 to 6 ($C_1$-$C_6$-alkyl) or 1 to 20 carbon atoms ($C_1$-$C_{20}$-alkyl). Examples of $C_1$-$C_4$-alkyl are methyl, ethyl, n-propyl, isopropyl, n-butyl, 2-butyl, isobutyl, tert-butyl (2-methylpropan-2-yl). Examples of $C_1$-$C_6$-alkyl are, as well as the definitions given for $C_1$-$C_4$-alkyl, additionally n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl. Examples of $C_1$-$C_{20}$-alkyl are, as well as the definitions given for $C_1$-$C_6$-alkyl, additionally heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl and the constitutional isomers thereof.

"$C_1$-$C_4$-Alkoxy-$C_1$-$C_4$-alkyl" is an alkyl group which has 1 to 4 carbon atoms and is bonded via an oxygen atom, for example methoxy, ethoxy, n-propoxy, 1-methylethoxy(isopropoxy), n-butoxy, 1-methylpropoxy(sec-butoxy), 2-methylpropoxy(isobutoxy) or 1,1-dimethylethoxy(tert-butoxy), which is bonded in the form of an ether bond via the oxygen to a $C_1$-$C_4$-alkyl group as defined above. Examples are methoxymethyl, 2-methoxyethyl, ethoxymethyl, 3-methoxypropyl, 3-ethoxypropyl.

"$C_6$-$C_6$-Cycloalkyl" is a cyclic alkyl radical having 5 to 6 carbon atoms. Examples are cyclopentyl and cyclohexyl.

"Phenyl-$C_1$-$C_4$-alkyl" is a phenyl group bonded to a $C_1$-$C_4$-alkyl group as defined above. Examples are benzyl, phenylethyl, phenylpropyl, phenylbutyl.

"$C_1$-$C_4$-Alkanediyl" is an alkanediyl having 1 to 4 carbon atoms. Examples are methanediyl, 1,1-ethanediyl, 1,2-ethanediyl, 1-methyl-1,1-ethanediyl, 1-methyl-1,2-ethanediyl, 1,3-propanediyl, 1,4-butanediyl, 1,1-dimethyl-1,2-ethanediyl and 1,2-dimethyl-1,2-ethanediyl.

"$C_1$-$C_8$-Alkoxy" is an alkyl group which has 1 to 8 carbon atoms and is bonded via an oxygen atom. Examples are methoxy, ethoxy, n-propoxy, 1-methylethoxy(isopropoxy), n-butoxy, 1-methylpropoxy(sec-butoxy), 2-methylpropoxy (isobutoxy), 1,1-dimethylethoxy(tert-butoxy), n-pentoxy, 1-methylbutoxy, 2-methylbutoxy, 3-methylbutoxy, 1,1-dimethylpropoxy, 1,2-dimethylpropoxy, 2,2-dimethylpropoxy, 1-ethylpropoxy, 2-ethylpropoxy, n-hexoxy, 1-methylpentoxy, 2-methylpentoxy, 3-methylpentoxy, 4-methylpentoxy, 1-ethylbutoxy, 2-ethylbutoxy, 3-ethylbutoxy, 1,2-dimethylbutoxy, 1,3-dimethylbutoxy, 2,3-dimethylbutoxy, 1-ethyl-2-methylpropoxy and 1-isopropylpropoxy.

"$C_1$-$C_4$-Alkylcarbonyl" is a $C_1$-$C_4$-alkyl radical as defined above, bonded via a carbonyl group, for example acetyl, propionyl, butyryl, pivaloyl etc.

With regard to preferred embodiments of the invention, the $R^1, R^2, R^3, R_4, R^5, R_6, R^7, R^8, A, X, Z$ and $Y$ radicals or groups in the compounds of the formula I and the groups of the formula I' preferably each independently have one or more or all of the following definitions:

$R^1$ is hydrogen or $C_1$-$C_6$-alkyl, particularly hydrogen or $C_1$-$C_4$-alkyl and especially methyl or ethyl;

$R^2$ is hydrogen or $C_1$-$C_6$-alkyl, particularly $C_1$-$C_4$-alkyl and especially methyl or ethyl;

$R^3$ is hydrogen;

A is $C_1$-$C_4$-alkanediyl, especially methanediyl, 1,2-ethanediyl or 1,3-propanediyl;

X is O;

Z is C=O;

Y is a chemical bond;

$R^4$ is hydrogen or $C_1$-$C_4$-alkyl, especially hydrogen or methyl;

$R^5$ is hydrogen;

$R^6$ is hydrogen;

$R^7$, if present, is $C_1$-$C_4$-alkyl;

$R^8$, if present, is $C_1$-$C_4$-alkyl.

The preparation of the compounds of the formula I is generally possible by the process explained in detail hereinafter, which likewise forms part of the subject matter of the present invention. In this process, a compound of the general formula II is reacted with a compound of the general formula III:

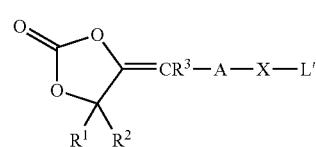

(II)

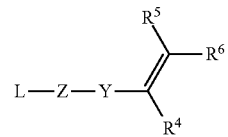

(III)

In formula II, L' is hydrogen or a hydroxyl or amino protecting group, for example a $C_1$-$C_4$-alkylcarbonyl group. The variables A, X, $R^1, R^2$ and $R^3$ are each as defined above, more particularly as defined with preference.

In formula III, L is a nucleophilically displaceable leaving group, for example halogen, OH or $C_1$-$C_8$-alkoxy. The variables Y, Z, $R^4, R^5$ and $R^6$ are each as defined above, especially as defined with preference.

The reaction of the compounds of the formulae II and III can be performed in analogy to known processes for nucleophilic substitution. If L' is a hydroxyl or amino protecting group, this protecting group is generally removed before the reaction of compound II with compound III, or reaction conditions under which the protecting group is detached are selected, such that the actual reactant is the compound of the formula II in which L' is hydrogen.

In a preferred embodiment of the invention, in formula III, the variable Z is C=O and the variable L is OH or $C_1$-$C_8$-alkoxy. In this case, the reaction of compound III with compound II, optionally after removal of the hydroxyl or amino protecting group, proceeds in the manner of an amidation or esterification or transesterification reaction.

More particularly, the esterification or transesterification is suitable for the preparation of compounds of the formula I in which Z is C=O and X is O, A is $C_1$-$C_4$-alkanediyl, $R^4$ is hydrogen or $C_1$-$C_4$-alkyl, especially hydrogen or methyl, and $R^5$ and $R^6$ are each hydrogen. In this case, preferred reactants of the formula III are selected from the $C_1$-$C_8$-alkyl esters of acrylic acid and of methacrylic acid, hereinafter $C_1$-$C_8$-alkyl (meth)acrylates, e.g. methyl, ethyl, n-butyl and 2-ethylhexyl (meth)acrylate, and most preferably $C_1$-$C_4$-alkyl(meth)acrylates, e.g. methyl, ethyl and n-butyl(meth)acrylate.

In a particularly preferred embodiment of the invention, in formula III, the variable L is OH or $C_1$-$C_8$-alkoxy, the variable Z is C=O, and, in formula II, the variable X is O, and the reaction of compound II with compound III is conducted under the conditions of an esterification or transesterification. In a specific configuration of this embodiment, L' in formula II is hydrogen or a $C_1$-$C_4$-alkylcarbonyl group, especially an acetyl group.

In a preferred embodiment of the process according to the invention, the compounds of the formula I are prepared by esterification or transesterification under enzyme catalysis.

The enzyme-catalyzed esterification or transesterification can be conducted in analogy to the methods described in Biotechnol. Lett. 1990, 12, 825-830, Biotechnol. Lett. 1994, 16, 241-246, U.S. Pat. No. 5,240,835, WO 2004/05088 or DE 102009003035, which are fully incorporated here by reference.

Enzymes (E) usable for the enzyme-catalyzed esterification or transesterification are, for example, selected from hydrolases, esterases (E.C. 3.1.-.-), lipases (E.C. 3.1.1.3), glycosylases (E.C. 3.2.-.-) and proteases (E.C. 3.4.-.-), in free form or in chemically or physically immobilized form on a carrier, preferably lipases, esterases or proteases. Particular preference is given to Novozym® 435 from Novozymes (lipase from *Candida antarctica* B) or lipase from *Aspergillus* sp., *Aspergillus niger* sp., *Mucor* sp., *Penicilium cyclopium* sp., *Geotricum candidum* sp., *Rhizopus javanicus, Bukholderia* sp., *Candida* sp., *Pseudomonas* sp. or porcine pancreas, very particular preference being given to lipase from *Candida antarctica* B or from *Burkholderia* sp.

The enzyme content in the reaction medium is generally in the range from about 0.1 to 10% by weight, based on the sum of the reactants of the formulae II and III used.

The compounds of the formula I can also be prepared by conventional esterification or transesterification under the reaction conditions of an acid-catalyzed esterification or of an acid- or base-catalyzed transesterification which are customary therefor.

Suitable acidic catalysts for an acid-catalyzed esterification are in particular protic acids, for example sulfuric acid, sodium hydrogensulfate, hydrochloric acid, phosphoric acid, monosodium dihydrogenphosphate, disodium hydrogenphosphate, pyrophosphoric acid, phosphorous acid, hypophosphorous acid, methanesulfonic acid, trifluoromethanesulfonic acid, p-toluenesulfonic acid and mixtures thereof. Also suitable are Lewis acids, for example titanium and tin compounds. Additionally suitable are acidic ion exchange resins, for example sulfonated or carboxylated ion exchange resins, each in the acid form thereof.

Suitable basic catalysts for a transesterification are metal hydroxides and/or alkoxides, especially of metals of groups 1, 2 and 13 of the Periodic Table, for example alkali metal hydroxides such as NaOH or KOH, and alkali metal and alkaline earth metal alkoxides, especially the corresponding methoxides or ethoxides such as sodium methoxide or potassium methoxide or sodium ethoxide or potassium ethoxide. Also suitable are ion-exchanging resins.

The acidic or basic catalysts are generally used in a concentration of 0.0001% by weight to 20% by weight, preferably 0.001% by weight to 10% by weight, based on the overall reaction mixture.

The esterification or transesterification reaction of II with III can be configured, for example, as a batch process. In this case, the compounds of the formulae II and III will generally be added to a reaction vessel and reacted with one another with addition of the catalyst or of the enzyme. Alternatively, the esterification or transesterification reaction can be configured as a semibatchwise process. For this purpose, for example, one of the reactants, for example compound II or compound III, and the catalyst or the enzyme can be initially charged, and the other reactants can be supplied in the course of the reaction. In addition, the compound of the formula I can be prepared by continuous reaction of compound II with compound III. For this purpose, for example, compounds II and III will be supplied continuously to a reaction zone comprising the catalyst, and the compound of the formula I will be withdrawn continuously from the reaction zone, optionally together with the coproducts formed in the reaction, for example alcohol or ester. Optionally, the catalyst or the enzyme will likewise be supplied to the reaction zone. Both in the semibatchwise reaction and in the continuous reaction, the reactants, i.e. the compounds of the formulae II and III, can be conducted, preferably in the liquid phase, through a reaction zone comprising the catalyst or the enzyme as a stationary phase.

The reaction time depends upon factors including the temperature, the amount used and the activity of the acid, base or enzyme catalyst, and on the required conversion, and on the structure of the compound II. The reaction time is preferably adjusted such that the conversion of compound II is at least 70%, preferably at least 80%, more preferably at least 90%, even more preferably at least 95% and especially at least 97%. In general, 1 to 48 hours, preferably 1 to 12 hours and more preferably 1 to 6 hours are sufficient for this purpose.

The enzyme-catalyzed or conventionally catalyzed esterification or transesterification is effected generally at temperatures of 0 to 100° C., preferably 20 to 80° C. and more preferably 20 to 70° C.

The molar ratio of compound II to compound III can be varied within a wide range. Preference is given to using compound III in excess based on the stoichiometry of the reaction. In general, the molar ratio of compound II to compound III is in the range from 1:100 to 1:1, preferably 1:50 to 1:1, more preferably 1:20 to 1:1. The compound of the formula III is preferably present in excess, such that it can be distilled off, for example as an azeotrope, under reduced pressure, together with the coproduct released, generally an alcohol or the ester coproduct formed in a transesterification (when X-L' in formula II is alkylcarbonyloxy and Y-L in formula III is alkoxycarbonyl). Additionally or alternatively, the water released or the alcohol or ester can be bound, for example, by means of a molecular sieve. In this way, the reaction equilibrium is shifted in favor of the compound of the formula I.

The enzyme-catalyzed and the conventionally catalyzed esterification or transesterification can be performed in organic solvents or mixtures thereof, or without addition of solvents. The mixtures are generally substantially anhydrous (i.e. water content below 10% by volume, preferably below 5% by volume, more preferably below 1% by volume).

The proportion of organic solvents in the reaction mixture may, for example, be 0.1 to 50% by weight and is, if a solvent is used, preferably in the range from 0.5 to 30% by weight or in the range from 1 to 10% by weight. Preference is given to adding no or less than 1% by weight of organic solvent to the enzyme-catalyzed or conventionally catalyzed esterification or transesterification.

The preparation of compound I can be performed in the presence of at least one polymerization inhibitor. The polymerization inhibitors used may, for example, be 4-methoxyphenol (MeHQ), hydroquinone, 2,5-di-tert-butylhydroquinone, 2,6-di-tert-butyl-p-cresol, nitroso compounds such as isoacryloyl nitrate, nitrosodiphenylamine, N-nitrosocyclohexylhydroxylamine, methylene blue, phenothiazine or diphenylamine. Preference is given to using 4-methoxyphenol (MeHQ) as the polymerization inhibitor.

The polymerization inhibitors are used generally, based on the amount of the compounds of the formula III, from 1 to 10 000 ppm, preferably from 10 to 5000 ppm, more preferably from 30 to 2500 ppm and especially from 50 to 1500 ppm.

The compounds of the formula III are known and are generally commercially available.

The compounds of the formula II can be prepared in analogy to known processes for preparing alkylidene-1,3-dioxolan-2-ones, as described, for example, in the prior art cited at the outset. Preferred compounds of the formula II in which $R^3$ is hydrogen can be prepared, for example, by reacting the compound of the formula IV with $CO_2$, preferably using a catalyst (see scheme 1):

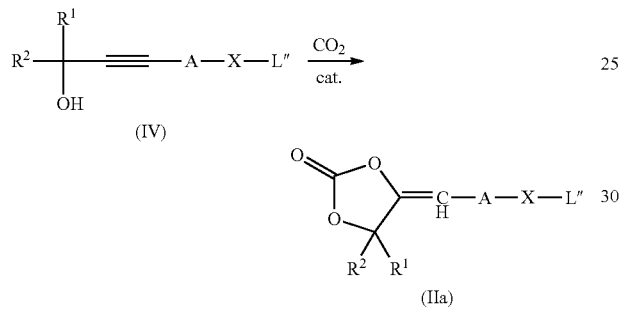

In scheme 1, $R^1$, $R^2$, A and X are each as defined above. L" is an alcohol or amino protecting group and particularly $C_1$-$C_4$-alkylcarbonyl, especially acetyl. X is particularly oxygen. A is particularly $C_1$-$C_4$-alkanediyl.

Useful catalysts are in principle transition metal catalysts which comprise, as the active metal, for example, silver, copper, gold, palladium or platinum, for example silver salts such as silver acetate, silver carbonate, copper(II) salts such as copper acetate or copper(I) halides such as CuI, CuBr, CuCl, and also palladium(0) catalysts, the aforementioned transition metal compounds optionally being usable in combination with an organic amine, for example a tri-$C_1$-$C_6$-alkylamine such as triethylamine, or an amidine base such as 1,5-diazabicyclo[4.3.0]non-5-ene (DBN) or 1,8-diazabicyclo[5.4.0]undec-7-ene (DBU), or with an organic phosphine, e.g. trialkylphosphines or triarylphosphines such as tributylphosphine and triphenylphosphine, or in combination with a mixture of one of the aforementioned phosphines with an ammonium salt, for example tri-$C_1$-$C_6$-alkylammonium halides or tetra-$C_1$-$C_6$-alkylammonium halides. Further useful catalysts include organic phosphines as such, for example trialkylphosphines or triarylphosphines such as tributylphosphine or triphenylphosphine, and sterically hindered carbenes, for example 1,3-substituted 2,3-dihydroimidazol-2-ylidene compounds such as 1,3-diisopropyl-2,3-dihydro-4,5-imidazol-2-ylidene, or the $CO_2$ adducts thereof, and combinations thereof with the aforementioned phosphines. The reaction can be conducted at ambient pressure or preferably under elevated pressure, for example at 50 to 500 bar, or in supercritical $CO_2$. With regard to the reaction conditions, reference is made to the aforementioned literature.

Instead of $CO_2$, it is also possible to use a carboxylic anhydride, for example bis(tert-butyl)dicarbonic anhydride ($Boc_2O$). In this case, the reaction is typically effected in two stages, in which case, in the first stage, the compound IV is reacted with an ester of biscarbonic anhydride, for example with $Boc_2O$, in the presence of a base, for example sodium hydride, and the ester obtained is cyclized in the presence of a transition metal catalyst, for example a gold catalyst. Such a procedure is described, for example, in Org. Lett. 2006, 8, 515-518, which is hereby incorporated by reference.

The invention also provides polymers comprising at least one compound of the formula I in polymerized form. Such polymers are typically obtainable by homo- or copolymerizing ethylenically unsaturated monomers M, the ethylenically unsaturated monomers M comprising at least one monomer of the general formula I (monomer a) and optionally one or more ethylenically unsaturated comonomers. Such polymers have a polymer backbone formed from carbon atoms, to which generally at least two groups of the general formula I', for example 2 to 1000 groups of the formula I', are bonded. Accordingly, such a polymer has at least two repeat units of the formula I":

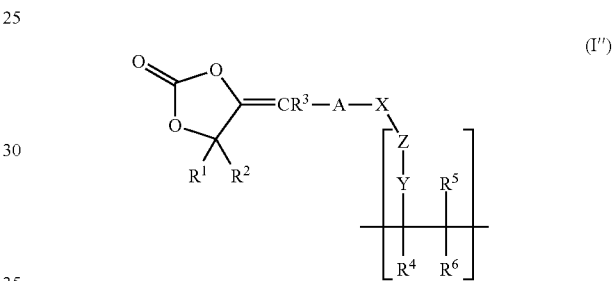

The proportion of compounds of the general formula I is preferably at least 10% by weight, particularly at least 15% by weight and especially at least 20% by weight, based on the total amount of monomers M to be polymerized, and may be up to 100% by weight. Accordingly, the proportion of repeat units of the general formula I" is preferably at least 10% by weight, particularly at least 15% by weight and especially at least 20% by weight, based on the total amount of repeat units present in the polymer, and may be up to 100% by weight.

A first embodiment of the invention relates to homopolymers of a compound of the formula I, i.e. the polymers are, apart from their end groups, formed exclusively from a particular repeat unit of the general formula I".

A second embodiment of the invention relates to copolymers of at least two different compounds of the formula I, i.e. the polymers are, apart from their end groups, formed exclusively from two or more different repeat units of the general formula I".

A third embodiment of the invention relates to copolymers formed from at least one compound of the formula I with at least one, e.g. 1, 2 or 3, different ethylenically unsaturated comonomer, i.e. compounds which do not have any group of the formula I'. Such inventive copolymers have, as well as repeat units of the formula I", also repeat units derived from the polymerized comonomer.

Suitable comonomers are particularly monoethylenically unsaturated comonomers, but also conjugatedly diethylenically unsaturated compounds. These are also referred to hereinafter as comonomers b. The comonomers b include, for example:

b1 monoethylenically unsaturated $C_3$-$C_8$-mono- and $C_4$-$C_8$-dicarboxylic acids, for example acrylic acid, methacrylic acid, vinylacetic acid, crotonic acid, fumaric acid, maleic acid and itaconic acid;

b2 amides of monoethylenically unsaturated $C_3$-$C_5$-mono- and $C_4$-$C_5$-dicarboxylic acids, such as acrylamide, methacrylamide, fumaramide and maleimide;

b3 anhydrides of monoethylenically unsaturated $C_4$-$C_8$-dicarboxylic acids, such as maleic anhydride;

b4 hydroxy-$C_2$-$C_4$-alkyl esters of monoethylenically unsaturated $C_3$-$C_8$-mono- and $C_4$-$C_8$-dicarboxylic acids, such as 2-hydroxyethyl acrylate, 2-hydroxypropyl acrylate, 3-hydroxypropyl acrylate, 2-hydroxybutyl acrylate, 4-hydroxybutyl acrylate, 2-hydroxyethyl methacrylate, 2-hydroxypropyl methacrylate, 3-hydroxypropyl methacrylate, 2-hydroxybutyl methacrylate, 4-hydroxybutyl methacrylate;

b5 monoethylenically unsaturated sulfonic acids and salts thereof, for example vinylsulfonic acid, allylsulfonic acid, methallylsulfonic acid, styrenesulfonic acid, 2-acrylamido-2-methylpropanesulfonic acid, 2-methacrylamido-2-methylpropanesulfonic acid, 2-acrylamidoethanesulfonic acid, 2-meth-acrylamidoethanesulfonic acid, 2-acryloyloxyethanesulfonic acid, 2-meth-acryloyloxyethanesulfonic acid, 3-acryloyloxypropanesulfonic acid and 2-methacryloyloxypropanesulfonic acid;

b6 monoethylenically unsaturated nitriles having 3 to 5 carbon atoms, such as acrylonitrile and methacrylonitrile;

b7 N-vinylheterocycles such as N-vinylpyrrolidone, N-vinylcaprolactam, N-vinylimidazole;

b8 monoethylenically unsaturated compounds having at least one poly-$C_2$-$C_4$-alkylene oxide group, for example vinyl and allyl ethers of poly-$C_2$-$C_4$-alkylene glycols or $C_1$-$C_{10}$-alkyl poly-$C_2$-$C_4$-alkylene glycols, esters of monoethylenically unsaturated mono- and dicarboxylic acids having 3 to 8 carbon atoms with poly-$C_2$-$C_4$-alkylene glycols or $C_1$-$C_{10}$-alkyl poly-$C_2$-$C_4$-alkylene glycols;

b9 vinylaromatic hydrocarbons such as styrene, α-methylstyrene and the vinyltoluene isomers;

b10 esters of monoethylenically unsaturated $C_3$-$C_8$-monocarboxylic acids with $C_1$-$C_{20}$-alkanols, $C_5$-$C_8$-cycloalkanols, phenyl-$C_1$-$C_4$-alkanols or phenoxy-$C_1$-$C_4$-alkanols, for example esters of acrylic acid with $C_1$-$C_{20}$-alkanols, such as methyl acrylate, ethyl acrylate, n-butyl acrylate, 2-butyl acrylate, isobutyl acrylate, tert-butyl acrylate, 2-ethylhexyl acrylate, decyl acrylate, lauryl acrylate and stearyl acrylate, esters of acrylic acid with $C_5$-$C_{10}$-cycloalkanols such as cyclohexyl acrylate, esters of acrylic acid with phenyl-$C_1$-$C_4$-alkanols, such as benzyl acrylate, 2-phenylethyl acrylate and 1-phenylethyl acrylate, esters of acrylic acid with phenoxy-$C_1$-$C_4$-alkanols, such as 2-phenoxyethyl acrylate, esters of methacrylic acid with $C_1$-$C_{20}$-alkanols, preferably $C_1$-$C_{10}$-alkanols, such as methyl methacrylate, ethyl methacrylate, n-butyl methacrylate, 2-butyl methacrylate, isobutyl methacrylate, tert-butyl methacrylate, 2-ethylhexyl methacrylate, decyl methacrylate, lauryl methacrylate and stearyl methacrylate, esters of methacrylic acid with $C_5$-$C_{10}$-cycloalkanols, such as cyclohexyl methacrylate, esters of methacrylic acid with phenyl-$C_1$-$C_4$-alkanols, such as benzyl methacrylate, 2-phenylethyl methacrylate and 1-phenylethyl methacrylate, and esters of methacrylic acid with phenoxy-$C_1$-$C_4$-alkanols, such as 2-phenoxyethyl methacrylate;

b11 diesters of monoethylenically unsaturated $C_4$-$C_8$-dicarboxylic acids with $C_1$-$C_{20}$-alkanols, $C_5$-$C_8$-cycloalkanols, phenyl-$C_1$-$C_4$-alkanols or phenoxy-$C_1$-$C_4$-alkanols;

b12 $C_1$-$C_{20}$-alkylamides and di-$C_1$-$C_{20}$-alkylamides of monoethylenically unsaturated $C_3$-$C_8$-monocarboxylic acids, especially the $C_1$-$C_{20}$-alkylamides and di-$C_1$-$C_{20}$-alkylamides of acrylic acid and of methacrylic acid, for example ethylacrylamide, dimethylacrylamide, diethylacrylamide, n-propylacrylamide, n-butylacrylamide, laurylacrylamide, stearylacrylamide, ethylmethacrylamide, dimethylmethacrylamide, diethylmethacrylamide, n-propylmethacrylamide, n-butylmethacrylamide, laurylmethacrylamide, stearylmethacrylamide;

b13 vinyl esters of aliphatic carboxylic acids having 1 to 20 carbon atoms, for example vinyl acetate, vinyl propionate, vinyl butyrate, vinyl hexanoate, vinyl laurate and vinyl stearate;

b14 conjugatedly diethylenically unsaturated $C_4$-$C_{10}$-olefins, such as butadiene and isoprene;

b15 $C_2$-$C_{20}$-olefins, such as ethylene, propene, 1-butene, 2-butene, isobutene, 1-hexene, 1-octene, diisobutene and 1-decene;

b16 halogen-substituted $C_2$-$C_{20}$-olefins, such as vinyl chloride, vinylidene chloride, vinyl bromide, fluoroethene, 1,1-difluoroethene and tetrafluoroethene;

b17 monoethylenically unsaturated monomers having one or two epoxide groups, such as mono- and diesters of monoethylenically unsaturated mono- or dicarboxylic acids, especially mono- and diesters of $C_3$-$C_{10}$-epoxyalkanols, e.g. mono- or diglycidyl esters of monoethylenically unsaturated $C_3$-$C_8$-mono- or $C_4$-$C_8$-dicarboxylic acids such as glycidyl acrylate and glycidyl methacrylate, or monoethylenically unsaturated ethers of $C_3$-$C_{10}$-epoxyalkanols, especially allyl- or methallyl ethers, e.g. allyl glycidyl ether and methallyl glycidyl ether;

b18 monoethylenically unsaturated monomers having at least one carbonate group, especially a cyclic carbonate group, e.g. a 1,3-dioxolan-2-one group or 4-methyl-1,3-dioxolan-2-one group, for example propylene carbonate acrylate ([1,3-dioxolan-2-on-4-yl]methyl acrylate) or propylene carbonate methacrylate ([1,3-dioxolan-2-on-4-yl]methyl methacrylate);

b19 esters of monoethylenically unsaturated $C_3$-$C_8$-monocarboxylic acids or monoethylenically unsaturated $C_4$-$C_8$-dicarboxylic acids with $C_8$-$C_{24}$-alkenols or $C_8$-$C_{24}$-alkanedienols, especially the esters of acrylic acid or of methacrylic acid, for example oleyl acrylate, oleyl methacrylate, linolyl acrylate or linolyl methacrylate.

Preferred comonomers b are the monomers of groups b1, b2, b4, b5, b6, b8, b9, b10, b12 and b13, especially the monomers of groups b9, such as preferably vinylaromatic hydrocarbons, specifically styrene, and b10, preferably esters of acrylic acid or methacrylic acid with $C_1$-$C_{20}$-alcohols, and combinations of monomers b1, b2, b4, b5, b6, b8, b9, b10, b12 and b13, especially b9 and/or b10, with one or more monomers of group b17, b18 or b19.

If the monomers of the formula I are copolymerized, the comonomers are preferably one or more comonomers selected from the monomers of groups b9 and b10, such as preferably vinylaromatic hydrocarbons, specifically styrene, and esters of acrylic acid or methacrylic acid with $C_1$-$C_{20}$-alcohols, such as n-butyl acrylate, 2-ethylhexyl acrylate, methyl acrylate and methyl methacrylate.

If the inventive polymer comprises at least one comonomer b, preferably a comonomer of groups b9 and b10, in copolymerized form, the monomers M to be polymerized comprise generally 1 to 99% by weight, particularly 5 to 95% by weight and especially 10 to 90% by weight of at least one compound of the formula I, and 1 to 99% by weight, particularly 5 to 95% by weight and especially 10 to 90% by weight of at least one, preferably monoethylenically unsaturated, comonomer b, where the figures in % by weight are based on the total amount of monomers M. Accordingly, the repeat units of the formula I" account for 1 to 99% by weight, particularly 5 to 95% by weight and especially 10 to 90% by weight, and the repeat units derived from the comonomers b for 1 to 99% by weight, particularly 5 to 95% by weight and especially 10 to 90% by weight, based on the total weight of all repeat units.

If the monomers of the formula I are copolymerized with a comonomer of group b9, such as a vinylaromatic hydrocarbon, for example styrene, and a comonomer of group b10, such as an ester of acrylic acid or methacrylic acid with a $C_1$-$C_{20}$-alcohol, for example methyl acrylate, methyl methacrylate, n-butyl acrylate or 2-ethylhexyl acrylate, the monomers of group b9 to be polymerized are used generally in an amount of 10 to 80% by weight, especially 20 to 60% by weight, and the monomers of group b10 to be polymerized in an amount of 10 to 80% by weight, especially 20 to 60% by weight, the figures in % by weight being based on the total amount of monomers M. In that case, the monomers of the formula I account for preferably 10 to 80% by weight, especially 20 to 60% by weight, based on the total amount of monomers M. More particularly, in that case, the comonomers of groups b9 and b10 are used in a ratio of comonomers of group b9 to comonomers of group b10 of 10:1 to 1:10, especially 5:1 to 1:5.

If the monomers of the formula I are copolymerized with a comonomer of group b10, such as an ester of acrylic acid or methacrylic acid with a $C_1$-$C_{20}$-alcohol, for example methyl acrylate, methyl methacrylate, n-butyl acrylate or 2-ethylhexyl acrylate, the monomers of group b10 to be polymerized are generally used in an amount of 10 to 95% by weight, preferably 20 to 90% by weight, and the monomers of the formula I in an amount of 5 to 90% by weight, preferably 10 to 80% by weight, based on the total amount of monomers M.

In a preferred embodiment, the comonomers b comprise at least 60% by weight, preferably at least 80% by weight, especially at least 90% by weight, based on the total amount of the comonomers b, of at least one hydrophobic monomer having a water solubility of not more than 80 g/l at 25° C. Examples of hydrophobic monomers b are the comonomers of groups b9 to b16, and among these preferably the comonomers of groups b9, b10, b12, b13 and b14.

In a further embodiment, the comonomers b comprise 60 to 99.99% by weight, preferably 80 to 99.95% by weight, especially 90 to 99.9% by weight, based on the total amount of the comonomers b, of at least one hydrophobic monomer having a water solubility of not more than 80 g/l at 25° C., and 0.01 to 40% by weight, especially 0.05 to 20% by weight or 0.1 to 10% by weight, based on the total amount of comonomers b, of at least one hydrophilic monomer having a water solubility of more than 80 g/l at 25° C. Examples of hydrophobic monomers b are the comonomers of groups b9 to b17 and b19, and among these preferably the comonomers of groups b9, b10, b12, b13 and b14. Examples of hydrophilic monomers b are the comonomers of groups b1 to b8 and b18, and among these preferably the comonomers of groups b1, b2, b4, b5, b6 and b8.

It may also be appropriate that the monomers M, as well as the monomers of the formula I and optionally the comonomer(s) b, comprise one or more polyethylenically unsaturated monomers having, for example, 2, 3 or 4 nonconjugated ethylenically unsaturated double bonds, which are also referred to hereinafter as monomers c. Examples of monomers c are diesters and triesters of ethylenically unsaturated carboxylic acids, especially the bis- and trisacrylates of diols or polyols having 3 or more OH groups, for example the bisacrylates and the bismethacrylates of ethylene glycol, diethylene glycol, triethylene glycol, neopentyl glycol or polyethylene glycol. Such monomers c are, if desired, generally used in an amount of 0.01 to 10% by weight, based on the total amount of monomers M to be polymerized.

The inventive polymers generally have a number-average molecular weight in the range from 1000 to $10^6$ g/mol, especially in the range from 1200 to $10^5$ g/mol. The weight-average molecular weight of the inventive polymers is frequently in the range from 1200 to $5 \times 10^6$ g/mol, especially in the range from 2000 to $2 \times 10^6$ g/mol.

The polymerization of the monomers M can be conducted by customary methods of free-radical polymerization. These include solution and precipitation polymerization, suspension polymerization and emulsion polymerization, including a miniemulsion polymerization.

In a preferred embodiment of the invention, the polymerization process is effected in a nonaqueous solvent or diluent as the polymerization medium. In other words, the polymerization is conducted in a solvent or diluent in the manner of a solution or precipitation polymerization, said solvent or diluent comprising only small amounts of water, if any. Based on the total volume of the polymerization mixture, the amount of water is frequently not more than 2% by weight, particularly not more than 1% by weight and especially not more than 0.5% by weight. Typically, the amount of water, based on the monomer, is not more than 10% by weight, frequently not more than 5% by weight, particularly not more than 2% by weight and especially not more than 1% by weight.

Suitable solvents or diluents are especially those in which the monomers M to be polymerized are soluble. It is also possible to polymerize in organic solvents in which the monomers to be polymerized are insoluble. The polymerization is then effected as an oil-in-oil emulsion or suspension polymerization, in which case, depending on the ratios of monomers and organic solvent, the monomers form the coherent phase or preferably the disperse phase.

Suitable solvents comprise especially aprotic solvents. These include aliphatic and cycloaliphatic hydrocarbons and halohydrocarbons, such as n-hexane, n-heptane, cyclohexane, dichloromethane, 1,2-dichloroethane, aromatic hydrocarbons and aromatic halohydrocarbons such as benzene, toluene, xylenes, chlorobenzene, dichlorobenzenes, anhydrides of aliphatic, nonpolymerizable carboxylic acids such as acetic anhydride, $C_1$-$C_6$-alkyl esters and $C_5$-$C_6$-cycloalkyl esters of aliphatic monocarboxylic acids having 1 to 4 carbon atoms, such as methyl acetate, ethyl acetate, propyl acetate, n-butyl acetate, methyl butyrate, ethyl butyrate, propyl butyrate, methyl propionate, ethyl propionate, propyl propionate, ethyl formate, butyl formate, cyclohexyl acetate and the like, $C_1$-$C_4$-alkoxy-$C_2$-$C_4$-alkyl alkanoates such as 1-methoxy-2-propyl acetate or 2-methoxyethyl acetate, N,N-di-$C_1$-$C_4$-alkylamides of aliphatic $C_1$-$C_4$-carboxylic acids, such as N,N-dimethylformamide, N,N-dimethylacetamide, N—$C_1$-$C_4$-alkyllactams such as N-methylpyrrolidone, N-ethylpyrrolidone, di-$C_1$-$C_4$-alkyl sulfoxides such as dimethyl sulfoxide, alicyclic and cyclic ketones having 3 to 8 carbon atoms, such as methyl ethyl ketone, acetone and cyclohexanone, di-$C_1$-$C_4$-alkyl ethers and aliphatic, cycloaliphatic and aromatic ethers such as diethyl ether, methyl tert-butyl ether, dioxane, tetrahydrofuran, monoglyme and anisole, and also cyclic and acyclic saturated carbonates having preferably 3 to 8 carbon atoms, such as ethylene carbonate (1,3-dioxolan-2-one) and propylene carbonate, $C_1$-$C_4$-dialkyl carbonates such as dimethyl carbonate, diethyl carbonate, dipropyl carbonate, dibutyl carbonate and mixtures of the aforementioned aprotic solvents. Suitable solvents for the polymerization are also protic solvents and mixtures thereof with one or more aprotic solvents. These include particularly aliphatic alcohols such as $C_2$-$C_4$-alkylene glycol mono-$C_1$-$C_4$-alkyl ethers such as 1-methoxy-2-propanol, $C_1$-$C_4$-alkyl $C_2$-$C_4$-alkylene glycol mono-$C_1$-$C_4$-alkyl ethers such as 1-methoxy-2-methyl-2-propanol, $C_1$-$C_{10}$-alkanols such as methanol, ethanol, n-propanol, isopropanol, n-butanol, 2-butanol, isobutanol, tert-butanol, amyl alcohol, isoamyl alcohol and mixtures of the aforementioned protic solvents.

Preferred solvents are $C_1$-$C_6$-alkyl esters of aliphatic $C_1$-$C_4$-monocarboxylic acids such as n-butyl acetate, $C_2$-$C_4$-alkylene glycol mono-$C_1$-$C_4$-alkyl ethers such as 1-methoxy-2-propanol, $C_1$-$C_4$-alkyl $C_2$-$C_4$-alkylene glycol mono-$C_1$-$C_4$-alkyl ethers such as 1-methoxy-2-methyl-2-propanol, $C_1$-$C_4$-dialkyl carbonates such as dimethyl carbonate, diethyl carbonate, dipropyl carbonate, dibutyl carbonate, cyclic carbonates such as ethylene carbonate and propylene carbonate, ethers such as glymes and anisole.

In the case of precipitation polymerization, the solvent or diluent is an organic solvent or diluent in which the copolymer is insoluble. In the case of solution polymerization, the solvent is an organic solvent in which the copolymer is soluble.

In general, the organic solvent will be such that the amount of monomers M to be polymerized, based on the total amount of monomers M plus solvent, is in the range from 10 to 65% by weight, especially in the range from 20 to 60% by weight. In the case of a solution polymerization, accordingly, polymer solutions with solids contents in the range from 10 to 90% by weight and especially 20 to 80% by weight are obtained.

The monomers M can be polymerized by customary methods of free-radical homo- or copolymerization. In general, for this purpose, the monomers M will be polymerized under reaction conditions under which free radicals form.

The free radicals are generally formed by using what is called a polymerization initiator, i.e. a compound which forms free radicals on decomposition, which can be triggered chemically, thermally or photochemically.

The suitable polymerization initiators include organic azo compounds, organic peroxides and hydroperoxides, inorganic peroxides and what are called redox initiators. The organic peroxide compounds include, for example, tert-butyl peroxy-2-ethylhexanoate, tert-butyl peroxypivalate, acetyl peroxide, benzoyl peroxide, lauroyl peroxide, tert-butyl peroxyisobutyrate, caproyl peroxide. The hydroperoxides include, as well as hydrogen peroxide, also organic hydroperoxides such as cumene hydroperoxide, tert-butyl hydroperoxide, tert-amyl hydroperoxide and the like. The azo compounds include, for example, 2,2'-azobisisobutyronitrile, 2,2'-azobis(2-methylbutyronitrile), 2,2'-azobis[2-methyl-N-(2-hydroxyethyl)propionamide], 1,1'-azobis(1-cyclohexanecarbonitrile), 2,2'-azobis(2,4-dimethylvaleronitrile), 2,2'-azobis(N,N'-dimethyleneisobutyramidine) 2,2'-azobis(N,N'-dimethylene-isobutyramidine), 2,2'-azobis(2-methylpropionamidine), N-(3-hydroxy-1,1-bis(hydroxymethyl)propyl)-2-[1-(3-hydroxy-1,1-bis-(hydroxymethyl)propylcarbamoyl)-1-methylethylazo]-2-methylpropionamide and N-(1-ethyl-3-hydroxypropyl)-2-[1-(1-ethyl-3-hydroxypropylcarbamoyl)-1-methylethylazo]-2-methylpropionamide. The inorganic peroxides include peroxodisulfuric acid and salts thereof, such as ammonium peroxodisulfate, sodium peroxodisulfate and potassium peroxodisulfate. Redox initiator systems are understood to mean initiator systems which comprise an oxidizing agent, for example a salt of peroxodisulfuric acid, hydrogen peroxide, or an organic peroxide such as tert-butyl hydroperoxide, and a reducing agent. As reducing agents, they preferably comprise a sulfur compound, which is especially selected from sodium hydrogensulfite, sodium hydroxymethanesulfinate and the hydrogensulfite adduct onto acetone. Further suitable reducing agents are phosphorus compounds such as phosphorous acid, hypophosphites and phosphinates, and hydrazine or hydrazine hydrate and ascorbic acid. In addition, redox initiator systems may comprise an addition of small amounts of redox metal salts, such as iron salts, vanadium salts, copper salts, chromium salts or manganese salts, for example the ascorbic acid/iron(II) sulfate/sodium peroxodisulfate redox initiator system. Particularly preferred initiators for the polymerization process according to the invention are azo compounds, especially azobisisobutyronitrile (AIBN).

For free-radical polymerization of the monomers M, these polymerization initiators are used generally in an amount of 0.01 to 5% by weight, especially in an amount of 0.1 to 3% by weight, based on the monomers to be polymerized.

For polymerization, the customary polymerization techniques can be employed. Particular mention should be made here of a (semi)batchwise process in which the majority, i.e. at least 60% by weight, especially at least 80% by weight and frequently the total amount of the monomers M to be polymerized is initially charged in the polymerization vessel, and the monomer feed process, in which the majority of the monomers M to be polymerized, frequently at least 60% by weight, particularly at least 80% by weight and especially at least 90% by weight, is added to the polymerization vessel in the course of the polymerization reaction. For reasons of practicability, in the case of relatively large batches, the polymerization is frequently performed as a monomer feed process.

The polymerization initiator can be initially charged in the polymerization vessel or added in the course of the polymerization reaction. The procedure will frequently be to add at least a portion of the initiator, preferably at least 50% by weight and especially at least 80% by weight of the polymerization initiator, over the course of the polymerization reaction.

More particularly, it has been found to be useful to initially charge a small portion of the monomers M, for example 0.1 to 20% by weight, based on the total amount of monomers M to be polymerized, optionally together with a portion or the entirety of polymerization initiator and a portion or the entirety of the solvent or diluent, in the polymerization vessel, to start the polymerization, for example by heating the polymerization mixture, and then to add the remainder of the monomers M and, if required, the remainder of polymerization initiator and solvent over the course of the polymerization.

The polymerization temperatures typically employed for the polymerization are, depending on the initiator system selected, generally in the range from 20 to 180° C., particularly in the range from 40 to 130° C. and especially in the range from 50 to 120° C.

The polymerization pressure is of minor importance and may be in the region of standard pressure or slightly reduced pressure, for example >800 mbar, or elevated pressure, for example up to 10 bar, though higher or lower pressures can likewise be employed.

The polymerization time will generally not exceed 10 hours and is frequently in the range from 1 to 8 hours.

The polymerization process according to the invention can be performed in the reactors customary for a free-radical polymerization, for example stirred tanks, especially those with close-clearance stirrers, including stirred tank cascades, and tubular reactors, which may optionally have dynamic and/or static mixing elements. The reactors generally have one or more devices for supply of the reactants and devices for withdrawal of the products, and optionally means for supplying and for removing the heat of reaction, and optionally means for controlling and/or monitoring the reaction parameters of pressure, temperature, conversion etc. The reactors can be operated batchwise or continuously.

After the polymerization has ended, the polymerization mixture can be worked up in a customary manner. In the case of a precipitation polymerization, the polymer can, for example, be filtered off. Volatile components, for example solvents, can also be removed by distillative measures. In the case of a solution polymerization, it is also possible to bring about a precipitation of the polymer obtained, for example by adding an organic solvent in which the polymer is insoluble. Optionally, the polymerization may also be followed by a solvent exchange, for example in order to convert the polymer from a solution to a dispersion. Optionally, the polymer obtained will be subjected to devolatization, in order to remove further volatile constituents.

The inventive polymers are suitable as a component in 2K binder compositions. 2K binder compositions are understood to mean a binder comprising at least two polyfunctional binder constituents which react with one another to form bonds and in doing so form a polymeric network. Due to the alkylidene-1,3-dioxolan-2-one groups present therein, the inventive polymers can react with numerous nucleophilic groups to form bonds. Examples of such nucleophilic groups are particularly aliphatic hydroxyl groups, aliphatic primary and secondary amino groups, phosphine groups, especially aliphatic phosphine groups, phosphonate groups, especially aliphatic phosphonate groups, and analogous phosphorus compounds, and also mercaptan groups, especially aliphatic mercaptan groups.

Accordingly, 2K binder compositions comprise, as well as at least one inventive polymer, generally additionally at least one compound having at least two functional groups F, for example 2, 3, 4, 5, 6, 7, 8, 9 or 10 functional groups F, which are selected from aliphatic hydroxyl groups, aliphatic primary or secondary amino groups, aliphatic phosphine, phosphonate and similar groups, and aliphatic mercaptan groups. These compounds are also referred to hereinafter as hardeners.

In general, the amount of hardener is selected such that the molar ratio of functional alkylidene-1,3-dioxolan-2-one groups of the formula I' to the functional groups F in the hardener is in the range from 1:10 to 10:1, particularly in the range from 5:1 to 1:5 and especially in the range from 1:2 to 2:1.

Preferred functional groups F are aliphatic hydroxyl groups and aliphatic primary and secondary amino groups.

The hardener may be a low molecular weight substance, which means that the molecular weight thereof is below 500 g/mol, or an oligomeric or polymeric substance having a number-average molecular weight above 500 g/mol.

The 2K binder compositions may also comprise one or more suitable catalysts for curing, which are guided in a known manner by the nature of the reactive functional groups F. The catalysts are, if desired, used in proportions of 0.01% by weight to about 10% by weight, based on the total weight of the inventive polymers having functional groups of the formula I' and of the hardener. In one configuration, no catalysts are required, particularly in the case of hardeners which have amino groups as functional groups, which means that the content of catalysts in the composition is then less than 0.01% by weight. Catalysts are preferably used when the hardener has reactive groups F other than amino groups, especially when the hardener has hydroxyl groups.

Catalysts used with preference are basic catalysts, more preferably organic amines and organic phosphines. Among the organic amines, preference is given to amidine bases, for example 1,8-diazabicyclo[5.4.0]undec-7-ene (DBU) and 1,5-diazabicyclo[4.3.0]non-5-ene (DBN), and to mono-$C_1$-$C_6$-alkyl-, di-$C_1$-$C_6$-alkyl- and tri-$C_1$-$C_6$-alkylamines, especially triethylamine and tert-butylamine. Among the organic phosphines, preference is given to trialkylphosphines and triarylphosphines, for example tri-n-butylphosphine and triphenylphosphine. The catalysts can of course also be used as mixtures, optionally in combination with tri-$C_1$-$C_6$-alkylammonium halides and copper salts, for example triphenylphosphine in combination with a tri-$C_1$-$C_6$-alkylammonium halide and a copper salt, e.g. copper(I) chloride, copper(I) bromide, copper(II) chloride or copper(II) sulfate.

The hardeners preferred in accordance with the invention include aminic hardeners, i.e. hardeners which have at least two primary or secondary amino groups, and alcoholic hardeners, i.e. compounds which have at least two hydroxyl groups.

The aminic hardeners, also amine hardeners hereinafter, include, for example, aliphatic and cycloaliphatic polyamines, aromatic and araliphatic polyamines and polymeric amines, for example amino resins and polyamidoamines. Amine hardeners crosslink polymers having 1,3-dioxolan-2-one groups, also called carbonate polymers hereinafter, by reaction of the primary or secondary amino functions of the polyamines with the 1,3-dioxolan-2-one groups of the carbonate polymers to form urethane functions. Preferred polyamine hardeners have an average of at least two primary or secondary amino groups per molecule, for example two, three or four primary or secondary amino groups per molecule. They may also additionally comprise one or more tertiary amino groups. Suitable polyamines are, for example, aliphatic polyamines such as ethylenediamine, 1,2- and 1,3-propanediamine, neopentanediamine, hexamethylenediamine, octamethylenediamine, 1,10-diaminodecane, 1,12-diaminododecane, diethylenetriamine, triethylenetetramine, tetraethylenepentamine, 2,2-dimethylpropylenediamine, trimethylhexamethylenediamine, 1-(3-aminopropyl)-3-aminopropane, 1,3-bis(3-aminopropyl)propane, 4-ethyl-4-methylamino-1-octylamine, and the like;

cycloaliphatic diamines, such as 1,2-diaminocyclohexane, 1,2-, 1,3-, 1,4-bis(aminomethyl)cyclohexane, 1-methyl-2,4-diaminocyclohexane, N-cyclohexylpropylene-1,3-diamine, 4-(2-aminopropan-2-yl)-1-methylcyclohexane-1-amine, isophoronediamine, 4,4'-diaminodicyclohexylmethane (Dicykan), 3,3'-dimethyl-4,4'-diaminodicyclohexylmethane, 3,3',5,5'-tetramethyl-4,4'-diaminodicyclohexylmethane, 4,8-diaminotricyclo[5.2.1.0]decane, norbornanediamine, menthanediamine, menthenediamine, and the like;

aromatic diamines, such as tolylenediamine, xylylenediamine, especially meta-xylylenediamine (MXDA), bis(4-aminophenyl)methane (MDA or methylenedianiline), bis(4-aminophenyl)sulfone (also known as DADS, DDS or dapsone), and the like;

cyclic polyamines, such as piperazine, N-aminoethylpiperazine, and the like;

polyetheramines, especially difunctional and trifunctional primary polyetheramines based on polypropylene glycol, polyethylene glycol, polybutylene oxide, poly(1,4-butanediol), polytetrahydrofuran (polyTHF) or polypentylene oxide, for example 4,7,10-trioxamidecane-1,3-diamine, 4,7,10-trioxamidecane-1,13-diamine, 1,8-diamino-3,6-dioxaoctane (XTJ-504 from Huntsman), 1,10-diamino-4,7-dioxadecane (XTJ-590 from Huntsman), 1,12-diamino-4,9-dioxadodecane (from BASF SE), 1,3-diamino-4,7,10-trioxamidecane (from BASF SE), primary polyetheramines based on polypropylene glycol having an average molar mass of 230, for example polyetheramine D 230 (from BASF SE) or Jeffamine® D 230 (from Huntsman), difunctional, primary polyetheramines based on polypropylene glycol having an average molar mass of 400, e.g. polyetheramine D 400 (from BASF SE) or Jeffamine® XTJ 582 (from Huntsman), difunctional, primary polyetheramines based on polypropylene glycol having an average molar mass of 2000, for example polyetheramine D 2000 (from BASF SE), Jeffamine® D2000 or Jeffamine® XTJ 578 (each from Huntsman), difunctional, primary polyetheramines based on propylene oxide having an average molar mass of 4000, for example polyetheramine D 4000 (from BASF SE), trifunctional, primary polyetheramines prepared by reacting propylene oxide with trimethylolpropane followed by an amination of the terminal OH groups, having an average molar mass of 403, for example polyetheramine T 403 (from BASF SE) or Jeffamine® T 403 (from Huntsman), trifunctional, primary polyetheramine prepared by reacting propylene oxide with glycerol, followed by an amination of the terminal OH groups, having an average molar mass of 5000, for example polyetheramine T 5000 (from BASF SE) or Jeffamine® T 5000 (from Huntsman), aliphatic polyetheramines formed from a propylene oxide-grafted polyethylene glycol and having an average molar mass of 600, for example Jeffamine® ED-600 or Jeffamine® XTJ 501 (each from Huntsman), aliphatic polyetheramines formed from a propylene oxide-grafted polyethylene glycol and having an average molar mass of 900, for example Jeffamine® ED-900 (from Huntsman), aliphatic polyetheramines formed from a propylene oxide-grafted polyethylene glycol and having an average molar mass of 2000, for example Jeffamine® ED-2003 (from Huntsman), difunctional, primary polyetheramine prepared by amination of a propylene oxide-grafted diethylene glycol, having an average molar mass of 220, for example Jeffamine® HK-511 (from Huntsman), aliphatic polyetheramines based on a copolymer of poly(tetramethylene ether glycol) and polypropylene glycol having an average molar mass of 1000, for example Jeffamine® XTJ-542 (from Huntsman), aliphatic polyetheramines based on a copolymer of poly(tetramethylene ether glycol) and polypropylene glycol having an average molar mass of 1900, for example Jeffamine® XTJ-548 (from Huntsman), aliphatic polyetheramines based on a copolymer of poly(tetramethylene ether glycol) and polypropylene glycol having an average molar mass of 1400, for example Jeffamine® XTJ-559 (from Huntsman), polyethertriamines based on a butylene oxide-grafted, at least trihydric alcohol having an average molar mass of 400, for example Jeffamine® XTJ-566 (from Huntsman), aliphatic polyetheramines prepared by amination of butylene oxide-grafted alcohols having an average molar mass of 219, for example Jeffamine® XTJ-568 (from Huntsman), polyetheramines based on pentaerythritol and propylene oxide having an average molar mass of 600, for example Jeffamine® XTJ-616 (from Huntsman), polyetheramines based on triethylene glycol having an average molar mass of 148, for example Jeffamine® EDR-148 (from Huntsman), difunctional, primary polyetheramines prepared by amination of a propylene oxide-grafted ethylene glycol, having an average molar mass of 176, for example Jeffamine® EDR-176 (from Huntsman), and also polyetheramines prepared by amination of polytetrahydrofuran (polyTHF) having an average molar mass of 250, for example PolyTHF-amine 350 (BASF SE), and mixtures of these amines;

polyamidoamines (amidopolyamines), which are obtainable by reaction of dimeric fatty acids (for example dimeric linoleic acid) with polyamines of low molecular weight, such as diethylenetriamine, 1-(3-aminopropyl)-3-aminopropane or triethylenetetramine, or other diamines, such as the aforementioned aliphatic or cycloaliphatic diamines;

adducts obtainable by reaction of amines, especially diamines, with a deficiency of epoxy resin or reactive diluent, preference being given to using those adducts in which about 5 to 20% of the epoxy groups have been reacted with amines, especially diamines;

phenalkamines as known from epoxide chemistry;

Mannich bases which are prepared, for example, by condensation of polyamines, preferably diethylenetriamine, triethylenetetramine, isophoronediamine, 2,2,4- or 2,4,4-trimethylhexamethylenediamine, 1,3- and 1,4-bis(aminomethyl)cyclohexane, with aldehydes, preferably formaldehyde, and mono- or polyhydric phenols having at least one aldehyde-reactive core site, for example the various cresols and xylenols, p-tert-butylphenol, resorcinol, 4,4'-dihydroxydiphenylmethane, 4,4'-dihydroxydiphenyl-2,2-propane, but preferably phenol;

and mixtures of the aforementioned amine hardeners, especially mixtures of difunctional amines from the group of the aliphatic, cycloaliphatic and aromatic amines with the aforementioned polyetheramines.

Preferred aminic hardeners are aliphatic polyamines, especially 2,2-dimethylpropylenediamine, aromatic diamines, especially m-xylylenediamine (MXDA), and cycloaliphatic diamines, especially isophoronediamine, N-cyclohexylpropylene-1,3-diamine and 4,4'-diaminodicyclohexylmethane (Dicykan). Preference is also given to difunctional or trifunctional primary polyetheramines based on polypropylene glycol, for example Jeffamine® D 230 or Jeffamine® T 403. Preference is also given to mixtures of the amines specified as preferred, for example mixtures comprising 2,2-dimethylpropyleneamine and isophoroneamine.

The alcoholic hardeners include particularly aliphatic and cycloaliphatic alcohols of low molecular weight. Alcoholic hardeners crosslink carbonate polymers by reaction of the primary or secondary alcohol functions with the 1,3-dioxolan-2-one groups of the carbonate polymers to form diesters of carbonic acid. Preferred alcoholic hardeners have an average of at least two primary or secondary hydroxyl groups per molecule, for example two, three or four primary or secondary hydroxyl groups per molecule. Suitable low molecular weight alcoholic hardeners are, for example, 1,4-butanediol, ethylene glycol, diethylene glycol, triethylene glycol, neopentyl glycol, 1,3-propanediol, 1,5-pentanediol, 1,6-hexanediol, glycerol, diglycerol, pentaerythritol, dipentaerythritol, sugar alcohols such as sorbitol and mannitol.

Suitable alcoholic hardeners are also higher molecular weight polymeric polyols, for example polyester polyols, polycarbonate polyols, polyether polyols, polyacrylate polyols and polyvinyl alcohols.

Suitable polymeric polyol hardeners generally have a mean OH functionality of at least 1.5 mol and especially at least 1.8, for example in the range from 1.5 to 10 and especially in the range from 1.8 to 4. The mean OH functionality is understood to mean the mean number of OH groups per polymer chain. Typical polymeric polyol components generally have a number-average molecular weight of about 250 to 50 000 g/mol, preferably of about 500 to 10 000 g/mol. Preferably, at least 50 mol % of the hydroxyl groups present in the polymeric polyol component are primary hydroxyl groups.

In general, polyester polyols are linear or branched polymeric compounds having ester groups in the polymer backbone and having free hydroxyl groups at the ends of the polymer chain. In general, these are polyesters which are obtained by polycondensation of dihydric alcohols with dibasic carboxylic acids, optionally in the presence of higher polyhydric alcohols (e.g. tri-, tetra-, penta- or hexahydric alcohols) and/or higher polybasic polycarboxylic acids. Rather than the free di- or polycarboxylic acids, it is also possible to use the corresponding di- or polycarboxylic anhydrides or corresponding di- or polycarboxylic esters of lower alcohols or mixtures thereof for preparation of the polyester polyols. The di- or polycarboxylic acids may be aliphatic, cycloaliphatic, araliphatic, aromatic or heterocyclic, generally have 2 to 50 and especially 4 to 20 carbon atoms and may optionally be substituted, for example by halogen atoms, and/or be unsaturated. Examples thereof include: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, alkenylsuccinic acid, fumaric acid and dimeric fatty acids. Useful diols for the preparation of the polyester polyols include especially aliphatic and cycloaliphatic diols having generally 2 to 40 and especially 2 to 20 carbon atoms, for example ethylene glycol, propane-1,2-diol, propane-1,3-diol, butane-1,3-diol, butane-1,4-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol and polybutylene glycols. Preference is given to alcohols of the general formula HO—$(CH_2)_x$—OH, where x is a number from 2 to 20, preferably an even number from 2 to 12. Examples thereof are ethylene glycol, butane-1,4-diol, hexane-1,6-diol, octane-1,8-diol and dodecane-1,12-diol. Additionally preferred are neopentyl glycol and pentane-1,5-diol.

Suitable alcoholic hardeners are also lactone-based polyester polyols, these being homo- or copolymers of lactones, preferably terminal hydroxyl-containing addition products of lactones onto suitable difunctional starter molecules. Useful lactones are preferably those which derive from compounds of the general formula HO—$(CH_2)_z$—COOH where z is a number from 1 to 20 and one hydrogen atom of one methylene unit may also be substituted by a $C_1$-$C_4$-alkyl radical. Examples are ε-caprolactone, β-propiolactone, γ-butyrolactone and/or methyl-ε-caprolactone and mixtures thereof. Suitable starter molecules are, for example, the low molecular weight dihydric alcohols mentioned above as a formation component for the polyester polyols. The corresponding polymers of ε-caprolactone are particularly preferred. It is also possible to use lower polyester diols or polyether diols as starters for preparation of the lactone polymers. Rather than the polymers of lactones, it is also possible to use the corresponding chemically equivalent polycondensates of the hydroxycarboxylic acids corresponding to the lactones.

Examples of suitable polyester polyols are, for example, the polyester polyols known from Ullmanns Enzyklopädie der Technischen Chemie, 4th Edition, Volume 19, pages 62 to 65.

In addition, polycarbonate polyols are also useful, as obtainable, for example, by reaction of phosgene with an excess of the low molecular weight alcohols mentioned as formation components for the polyester polyols.

The polyether polyols are especially polyether polyols preparable by polymerization of ethylene oxide, propylene oxide, butylene oxide, tetrahydrofuran, styrene oxide or epichlorohydrin with themselves, for example in the presence of $BF_3$, or by addition of these compounds, optionally in a mixture or in succession, onto bi- or polyfunctional starter components having reactive hydrogen atoms, such as polyols or polyfunctional amines, for example water, ethylene glycol, propane-1,2-diol, propane-1,3-diol, 1,1-bis(4-hydroxyphenyl)propane, trimethylolpropane, glycerol, sorbitol, ethanolamine or ethylenediamine. Also useful are sucrose polyethers (see DE 1176358 and DE 1064938), and formitol- or formose-started polyethers (see DE 2639083 and DE 2737951).

Likewise suitable are polyhydroxy olefins, preferably those having 2 terminal hydroxyl groups, e.g. α,ω-dihydroxypolybutadiene.

Likewise suitable are polyhydroxypolyacrylates, where the hydroxyl groups may be arranged laterally or terminally. Examples thereof are α,ω-dihydroxypoly(meth)acrylic esters obtainable by homo- or copolymerization of alkyl esters of acrylic acid and/or of methacrylic acid in the presence of regulators comprising OH groups, such as mercaptoethanol or mercaptopropanol, and subsequent transesterification with a low molecular weight polyol, for example an alkylene glycol such as butanediol. Such polymers are known, for example, from EP-A 622 378. Examples thereof are additionally polymers obtainable by copolymerization of alkyl esters of acrylic acid and/or of methacrylic acid with hydroxyalkyl esters of ethylenically unsaturated carboxylic acids such as hydroxyethyl acrylate, hydroxypropyl acrylate, hydroxybutyl acrylate, hydroxyethyl methacrylate, hydroxypropyl methacrylate or hydroxybutyl methacrylate.

Also suitable are polyvinyl alcohols, which can generally be obtained by full or partial hydrolysis of polyvinyl esters, especially polyvinyl acetate. If the polyvinyl esters, preferably polyvinyl acetate, are in partly hydrolyzed form, preferably not more than 50 to 95% of the ester groups are in hydrolyzed form as hydroxyl groups. If the polyvinyl esters, preferably polyvinyl acetate, are in fully hydrolyzed form, generally more than 95% up to 100% of the ester groups are in hydrolyzed form as hydroxyl groups.

Alcoholic hardeners preferred among the higher molecular weight polymeric polyols are especially polyacrylate polyols, these being obtainable, for example, under the Joncryl® brand name from BASF SE, e.g. Joncryl® 945.

Suitable hardeners are also amino acids, for example lysine, arginine, glutamine and asparagine, and the stereoisomers thereof and mixtures thereof.

It will be appreciated that it is also possible to use mixtures of different hardeners, for example mixtures of one or more aminic hardeners with one or more alcoholic hardeners, mixtures of one or more aminic hardeners with one or more amino acids, or mixtures of one or more alcoholic hardeners with one or more amino acids.

In the inventive binder compositions, the total amount of hardeners is generally 0.1% by weight to 50% by weight, frequently 0.5 to 40% by weight and especially 1 to 30% by weight, based on the total amount of carbonate polymers plus hardeners used.

The binder composition can be hardened thermally by heating the mixture of inventive polymer and hardener to a temperature above the mixing temperature. The hardening can also be effected at lower temperatures. Typically, the inventive binder compositions are hardened at temperatures in the range from 0 to 200° C., preferably in the range from 5 to 180° C. and especially in the range from 10 to 150° C. The temperature which is suitable depends on the respective hardeners and the desired hardening rate, and can be determined in the individual case by the person skilled in the art, for example by simple preliminary tests. In the lower temperature range (5 to approx. 35° C.), which of course corresponds to the usually prevailing ambient temperature, it is of course sufficient to mix inventive polymer and hardener. Alternatively, the hardening is preferably microwave-induced.

As well as the aforementioned constituents, the 2K binder composition may comprise the fillers and/or additives customary therefor.

Suitable fillers are, for example, inorganic or organic particulate materials, for example calcium carbonates and silicates, and inorganic fiber materials, for example glass fibers. It is also possible to use organic fillers such as carbon fibers, and mixtures of organic and inorganic fillers, for example mixtures of glass and carbon fibers, or mixtures of carbon fibers and inorganic fillers. The fillers can be added in an amount of 1 to 75% by weight, based on the total weight of the composition.

Suitable conventional additives comprise, for example, antioxidants, UV absorbers/light stabilizers, metal deactivators, antistats, reinforcers, fillers, antifogging agents, blowing agents, biocides, plasticizers, lubricants, emulsifiers, colorants, pigments, rheology agents, impact tougheners, catalysts, adhesion regulators, optical brighteners, flame retardants, antidripping agents, nucleating agents, solvents and reactive diluents, and mixtures thereof.

Any light stabilizers/UV absorbers, antioxidants and metal deactivators used preferably have a high migration stability and thermal stability. They are selected, for example, from groups a) to t). The compounds of groups a) to g) and i) are light stabilizers/UV absorbers, while compounds j) to t) act as stabilizers.
a) 4,4-diarylbutadienes,
b) cinnamic esters,
c) benzotriazoles,
d) hydroxybenzophenones,
e) diphenyl cyanacrylates,
f) oxamides,
g) 2-phenyl-1,3,5-triazines,
h) antioxidants,
i) nickel compounds,
j) sterically hindered amines,
k) metal deactivators,
l) phosphites and phosphonites,
m) hydroxylamines,
n) nitrones,
o) amine oxides,
p) benzofuranones and indolinones,
q) thiosynergists,
r) peroxide-destroying compounds,
s) polyamide stabilizers and
t) basic costabilizers.

The choice of suitable conventional additives for the inventive composition depends on the particular end use of the 2K binder composition, and can be determined in the individual case by the person skilled in the art.

The inventive 2K binder compositions are especially suitable for production of coatings.

The binder composition can be applied for the purpose of producing a paint layer by all customary application methods, for example spraying, knifecoating, painting, casting, dipping or rolling. Preference is given to employing spray application methods, for example compressed air spraying, airless spraying, high-speed rotation, electrostatic spray application (ESTA), optionally combined with hot spray application, for example hot air spraying. The application can be conducted at temperatures of max. 70 to 80° C., such that suitable application viscosities are attained without any occurrence, in the course of the brief thermal stress, of any alteration or damage to the coating composition, and to the overspray thereof, which may have to be reprocessed. For instance, the hot spraying may be configured such that the coating composition is heated only very briefly within the spray nozzle, or shortly upstream thereof.

The spray cabin used for the application can be operated, for example, with an optionally temperature-controllable circulation system which is operated with a suitable absorption medium for the overspray, for example the coating composition itself.

The application of the binder composition can also be performed in such a way that the components are not mixed until shortly before application in a mixing chamber upstream of the spray nozzle, this application method being especially suitable for 2K compositions with short pot lives.

It will be appreciated that the above-described application methods can also be employed in the production of further paint layers or of the basecoat in the course of production of a multilayer system. In this case, it is possible to employ different coating materials for the formation of each of the different layers. Preference is given to application on a basecoat.

Useful substrates include all paintable surfaces amenable to combined hardening, either primed or unprimed; examples include: metals, plastics, wood, ceramic, stone, textile, fiber composites, leather, glass, glass fibers, glass wool and rock wool, mineral- and resin-bound building materials such as gypsum boards and cement slabs, or roof tiles.

The inventive 2K binder compositions are especially also suitable for adhesives.

As adhesives, particular mention is made of 2K structural adhesives. Structural adhesives serve for permanent bonding of moldings to one another. The moldings may be made of any material; useful materials include plastic, metal, wood, leather, ceramic etc. The adhesives may also be floor adhesives. The compositions are also suitable as adhesives for the production of circuit boards (electronic circuits), more particularly also by the SMT method (surface mounted technology).

The examples which follow serve to illustrate the invention.

Preparation Examples

Preparation Example 1

5-methylhex-3-yne-1,5-diol

The synthesis was effected analogously to Bull. Acad. Sci. USSR 1965, 683.

In an 8 l reactor with 3-level 2-blade offset shear blade stirrer and thermostat, 100.0 g (1.384 mol) of 3-butyn-1-ol (purity 97.0%, from Acros) were dissolved at 20° C. under $N_2$ atmosphere in 3.92 l of toluene (purity 99.9%, from BASF SE), and 320.0 g (4.848 mol) of KOH (purity 85.0%, from BASF SE) were added while stirring. Within 20 min, a mixture of 441.0 ml (6.00 mol) of acetone and 320.9 ml of toluene was added. 3 l of demineralized water were added gradually to the reaction mixture in order to completely dissolve the solids. The phases were separated and the aqueous phase was extracted twice with 2 l each time of ethyl acetate. The solvent of the combined organic phases was removed under reduced pressure (50° C., approx. 5 mbar). This gave 183.5 g of the product.

The identity of the product with the title compound was checked by gas chromatography (GC method: ESMA6F, 30 m RTX-5-Amine 1 µm. 32 mm/80-0-R: 15° C./min-250).

Preparation Example 2

5-hydroxy-5-methylhex-3-ynyl acetate 100 g (0.78 mol) of 5-methylhex-3-yne-1,5-diol were dissolved in 800 ml of dichloromethane and cooled to 0° C. 113 ml (1.11 mol) of acetic anhydride were added in one portion. 127 ml (1.25 mol) of triethylamine were cooled to 0-2° C. and added within 20 min. The reaction mixture was stirred at 0° C. for 2 h. The cooling was removed and the reaction mixture was stirred a 20° C. for 16 h. The mixture was cooled to 0° C. and 1200 ml of a 5% hydrochloric acid solution were added, in the course of which the temperature of the reaction mixture was kept below 5° C. The mixture was extracted three times with 150 ml each time of tert-butyl methyl ether (MTBE), and the combined organic phases were stirred four times with 400 ml each time of 5% aqueous sodium hydrogen carbonate solution for 1 h each time, until no further evolution of gas was observable in each case. The organic phase was washed with 1 l of demineralized water and dried over sodium sulfate, and the solvent was removed. This gave 122.21 g (yield 92%) of a clear, dark yellow liquid. The purity was determined by gas chromatography to be 99.5%.

$^1$H NMR (CDCl$_3$, 500 MHz): 1.5 (s, 6H, C(CH$_3$)$_2$), 2.1 (s, 3H, C(O)CH$_3$), 2.5 (t, 2H, CH$_2$CH$_2$O), 3.4 (bs, 1H, OH), 4.1 (t, 2H, CH$_2$CH$_2$O) ppm.

Preparation Example 3

4,4-dimethyl-5-(3-acetoxypropylidene)-1,3-dioxolan-2-one (exo-VC-OAc)

A 300 nil autoclave was initially charged with 50 g of 5-hydroxy-5-methylhex-3-ynyl acetate in 74 ml of toluene. To this were added 0.9 g of silver acetate and 7.8 g of 1,8-diazabicyclo[5.4.0]undec-7-ene (DBU). The reaction mixture was heated to 70° C. and a CO$_2$ pressure of 50 bar was established. After 40 h, the reaction mixture was decompressed to standard pressure and washed twice with 100 ml each time of water and with 100 ml of 5% hydrochloric acid solution. The combined aqueous phases were extracted with 100 ml of toluene, and the combined organic phases were dried over sodium carbonate. The solvent was removed, and the resulting residue was recrystallized from 200 g of cyclohexane. This gave 35 g of the product of the title compound (purity >99%). The identity of the title compound was checked by gas chromatography (GC method: 30 m FFAP ID=0.32 mm, FD=0.25 µm; 80° C. 6K/min to 250° C., hold temp; retention time: 20.6 min).

$^1$H NMR (CDCl$_3$, 500 MHz): 1.5 (s, 6H, C(CH$_3$)$_2$), 2.1 (s, 3H, C(O)CH$_3$), 2.5 (t, 2H, CH$_2$CH$_2$O), 3.4 (bs, 1H, OH), 4.1 (t, 2H, CH$_2$CH$_2$O) ppm.

Example 1

(3Z)-3-(5,5-dimethyl-2-oxo-1,3-dioxolan-4-ylidene) propyl acrylate (exo-VCA)

280 g (1.31 mol) of (3Z)-3-(5,5-dimethyl-2-oxo-1,3-dioxolan-4-ylidene)propyl acetate (exo-VC-OAc), 1307 g (13.1 mol) of ethyl acetate, 0.28 g of 4-methoxyphenol (MeHQ) and 84 g (30% by weight) of Novozym® 435 from Novozymes were combined. The mixture was stirred at 40° C. for 24 h. The mixture was filtered and washed through with acetone, and the solvent was removed at 40° C. on a rotary evaporator. This gave 276.7 g of the product of the title compound with a purity of 92.4% (GC analysis).

$^1$HNMR (CDCl$_3$, 400 MHz): 1.6 (s, 6H), 2.5 (q, 2H), 4.2 (t, 2H), 4.7 (t, 1H), 5.84-5.87 (dd, 1H), 6.09-6.16 (dd, 1H), 6.37-6.42 (dd, 1H) ppm.

Polymerization Examples

Example 2

Homopolymerization of Exo-VCA in 1-Methoxy-2-Propanol

A 250 ml flask with stirrer was initially charged with 106.5 g of 1-methoxy-2-propanol and 30.0 g of exo-VCA (solids content: 20%). The mixture was heated to 120° C. in a nitrogen stream while stirring. To this was added a solution of 0.3 g of tert-butyl peroxy-2-ethylhexanoate (from Akzo Nobel) in 14.7 g of 1-methoxy-2-propanol within 3 h. The reaction mixture was stirred at 120° C. for 1 h.

After cooling to 20° C., the polymer, without prior isolation, was analyzed by means of gel permeation chromatography (GPC) with the solvent tetrahydrofuran (GPC analyzer from Waters, flow rate: 1 ml of THF/min, UV detector Lambda-Max 481, 254 nm, from Waters; four series-connected PL-Gel columns, column material: crosslinked polystyrene-divinylbenzene matrix, particle size 5 µm, pore sizes: 2×500 angstrom, 1×1000 angstrom, 1×10 000 angstrom). The analysis showed a polymer with Mn=2940 g/mol and Mw=6680 g/mol, which corresponds to a polydispersity of about 2.3.

$^1$H NMR spectrum (CDCl$_3$, 400 MHz) of the polymer has, among others, a signal with a chemical shift of 4.7 ppm, which can be assigned to the hydrogen atom of the unsaturated CH group in the α position to the 1,3-dioxolan-2-one ring, and a signal with a chemical shift at about 4.1 ppm, which can be assigned to the CH$_2$ group in the α position to the acrylate radical (reference: tetramethylsilane). The intensity ratio of the two signals is 0.99:2.00. The $^1$H NMR spectrum thus confirms that the exocyclic double bond in the 5 position of the 1,3-dioxolan-2-one ring has been preserved. The $^{13}$C NMR spectrum (CDCl$_3$, 100 MHz) shows the signal of the carbon atom of the carbonyl group of the 1,3-dioxolan-2-one ring at about 151 ppm, the signal of the olefinic endocyclic carbon atom at about 153 ppm and the signal of the carbon atom of the CH group in the α position to the 1,3-dioxolan-2-one ring at about 96 ppm.

Example 3

Homopolymerization of Exo-VCA in Dimethyl Carbonate

A 250 ml flask with stirrer was initially charged with 35.0 g of dimethyl carbonate and 10.0 g of exo-VCA (solids content: 17%). The mixture was heated to 85° C. in a nitrogen stream while stirring. To this was added a solution of tert-butyl peroxypivalate (0.3 g, 75% in hydrocarbons, from Pergan) in 14.9 g of dimethyl carbonate within 3 h. The reaction mixture was stirred at 85° C. for 1 h.

The polymer was analyzed, without prior isolation, by means of GPC (tetrahydrofuran solvent). The analysis showed a polymer with Mn=1153 g/mol and Mw=36 769 g/mol, which corresponds to a polydispersity of about 31.9. The $^1$H NMR spectrum shows the same signals and relative intensities as the spectrum of example 2.

Example 4

Homopolymerization of Exo-VCA in Glyme

The preparation was effected analogously to example 3, except that the solvent was glyme and the solids content was 30%.

After cooling to 20° C., the polymer, without prior isolation, was analyzed by means of gel permeation chromatography (GPC) with the solvent tetrahydrofuran. The analysis showed a polymer with Mn=1123 g/mol and Mw=35004 g/mol, which corresponds to a polydispersity of about 31.2.

Example 5

Homopolymerization of Exo-VCA in Anisole

The preparation was effected analogously to example 3, except that the solvent was anisole and the solids content was 30%.

After cooling to 20° C., the polymer, without prior isolation, was analyzed by means of gel permeation chromatography (GPC) with the solvent tetrahydrofuran. The analysis showed a polymer with Mn=711 g/mol and Mw=120 710 g/mol, which corresponds to a polydispersity of about 169.8.

Example 6

Copolymerization of Exo-VCA and n-Butyl Acrylate, 20:80 w/w

A 250 ml flask with stirrer was initially charged with 54.0 g of dimethyl carbonate, 2.4 g of n-butyl acrylate and 6.0 g of exo-VCA (solids content: 25%). The mixture was heated to 85° C. in a nitrogen stream while stirring. To this was added a solution of 0.4 g of tert-butyl peroxypivalate (75% in hydrocarbons, from Pergan) in 15.0 g of dimethyl carbonate within 3.5 h. 15 min after the start of the addition, a solution of 21.6 g of n-butyl acrylate in 21.6 g of dimethyl carbonate was added over 3 h. Once both solutions had been added completely, the reaction mixture was stirred at 85° C. for 1 h.

The $^1$H NMR spectrum (CDCl$_3$, 400 MHz) of the polymer has, among others, a signal with a chemical shift of 4.7 ppm, which can be assigned to the hydrogen atom of the unsaturated CH group in the α position to the 1,3-dioxolan-2-one ring, and a signal with a chemical shift at about 4.1 ppm, which can be assigned to the CH$_2$ group in the α position to the acrylate radical and the CH$_2$—O group of the n-butyl acrylate (reference: tetramethylsilane). The intensity ratio between the signal of the CH proton of the unsaturated bond on the carbonate ring and the overlapping signals of the CH$_2$—O group is 1:10, as expected for a ratio of exo-VCA and n-butyl acrylate of 20:80 w/w.

Example 7

Copolymerization of Exo-VCA, Styrene and 2-Ethylhexyl Acrylate (EHA), 35:35:30 w/w 56.4 g of n-butyl acetate were introduced into a 250 ml flask and heated to 120° C. in a nitrogen stream while stirring. To this were added simultaneously, within 2 h, a mixture of 4.8 g of tert-butyl peroctoate and 24.0 g of n-butyl acetate, and a mixture of 42.0 g of styrene, 36.0 g of 2-ethylhexyl acrylate (EHA) and 42.0 g of exo-VCA. Once the two mixtures had been added, a mixture of 0.6 g of tert-butyl peroctoate and 3.0 g of n-butyl acetate was added within 15 min and the reaction mixture was then stirred at 120° C. for 2 h.

The solids content was 38%. GPC analysis with tetrahydrofuran showed a polymer with Mn=2009 g/mol and Mw=8775 g/mol, which corresponds to a polydispersity of about 4.3.

Example 8

Copolymerization of Exo-VCA, Styrene and 2-Ethylhexyl Acrylate (EHA), 35:35:30 w/w The preparation was analogous to example 7, more particularly with variation of the amount of n-butyl acetate initially charged.

The solids content was 60.1%. GPC analysis with tetrahydrofuran showed a polymer with Mn=2887 g/mol and Mw=17 818 g/mol, which corresponds to a polydispersity of about 6.2.

Example 9

Copolymerization of Exo-VCA, Styrene and 2-Ethylhexyl Acrylate (EHA), 35:35:30 w/w The preparation was analogous to example 7, more particularly with variation of the amount of n-butyl acetate initially charged.

The solids content was 72.5%. GPC analysis with tetrahydrofuran showed a polymer with Mn=3285 g/mol and Mw=26 100 g/mol, which corresponds to a polydispersity of about 8.0.

Example 10

Copolymerization of Exo-VCA, Styrene and 2-Ethylhexyl Acrylate (EHA), 35:35:30 w/w The preparation was analogous to example 7, more particularly with variation of the amount of n-butyl acetate initially charged.

The solids content was 80.2%. GPC analysis with tetrahydrofuran showed a polymer with Mn=4565 g/mol and Mw=58 671 g/mol, which corresponds to a polydispersity of about 12.9.

Example 11

Copolymerization of Exo-VCA, Styrene and 2-Ethylhexyl Acrylate (EHA), 35:35:30 w/w 47.0 g of 1-methoxy-2-methyl-2-propanol were introduced into a 250 ml flask and heated to 120° C. in a nitrogen stream while stirring. To this were added simultaneously, within 2 h, a mixture of 8.0 g of tert-butyl peroctoate and 40.0 g of 1-methoxy-2-methyl-2-propanol and a mixture of 42.0 g of styrene, 36.0 g of 2-ethylhexyl acrylate (EHA) and 42.0 g of exo-VCA. Once the two mixtures had been added, a mixture of 0.5 g of tert-butyl peroctoate and 2.5 g of 1-methoxy-2-methyl-2-propanol was added within 15 min and the reaction mixture was then stirred at 120° C. for 2 h.

The solids content was 61.0%. GPC analysis with tetrahydrofuran showed a polymer with Mn=3249 g/mol and Mw=15 192 g/mol, which corresponds to a polydispersity of about 4.7.

Example 12

Copolymerization of Exo-VCA, Styrene and 2-Ethylhexyl Acrylate (EHA), 35:35:30 w/w 94.0 g of n-butyl acetate, 7.0 g of styrene and 7.0 g of exo-VCA were introduced into a 250 ml flask and heated to 120° C. in a nitrogen stream while stirring. To this were added simultaneously, within 2 h, a mixture of 13.6 g of tert-butyl peroctoate and 68.0 g of n-butyl acetate and a mixture of 63.0 g of styrene, 69.0 g of 2-ethylhexyl acrylate (EHA) and 72.4 g of exo-VCA. Once the two mixtures had been added, a mixture of 1.0 g of tert-butyl peroctoate and 5.0 g of n-butyl acetate was added within 15 min and the reaction mixture was then stirred at 120° C. for 2 h.

The solids content was 60.3%. GPC analysis with tetrahydrofuran showed a polymer with Mn=2546 g/mol and Mw=15 298 g/mol, which corresponds to a polydispersity of about 6.0.

Example 13

Copolymerization of Exo-VCA and 2-Ethylhexyl Acrylate (EHA), 50:50 w/w 72.0 g of n-butyl acetate, 3.6 g of 2-ethylhexyl acrylate (EHA) and 18.0 g of exo-VCA were introduced into a 250 ml flask and heated to 85° C. in a nitrogen stream while stirring. To this were added, within 3.5 h, a mixture of 0.48 g of tert-butyl peroxypivalate (75% in hydrocarbons, from Pergan) and 18.0 g of n-butyl acetate. 15 min after the start of the addition, a mixture of 14.4 g of 2-ethylhexyl acrylate (EHA) and 14.4 g of n-butyl acetate was added over 3 h. Once both mixtures had been added, the reaction mixture was stirred at 85° C. for 1 h. Subsequently, within 15 min, a mixture of 0.48 g of tert-butyl peroxypivalate (75% in hydrocarbons, from Pergan) and 18.0 g of n-butyl acetate was added within 5 min, and the reaction mixture was then stirred at 85° C. for 1 h.

The solids content was 22.9%. GPC analysis with tetrahydrofuran showed a polymer with Mn=4591 g/mol and Mw=42 040 g/mol, which corresponds to a polydispersity of about 9.2.

Example 14

Copolymerization of Exo-VCA and 2-Ethylhexyl Acrylate (EHA), 50:50 w/w 105.0 g of n-butyl acetate were introduced into a 250 ml flask and heated to 120° C. in a nitrogen stream while stirring. To this were added simultaneously, within 2 h, a mixture of 2.8 g of tert-butyl peroctoate and 28.0 g of n-butyl acetate and a mixture of 35.0 g of 2-ethylhexyl acrylate (EHA), 35.0 g of exo-VCA and 35.0 g of n-butyl acetate. Once both mixtures had been added, a mixture of 0.35 g of tert-butyl peroctoate and 3.5 g of n-butyl acetate was added within 15 min and the reaction mixture was then stirred at 120° C. for 2 h.

The solids content was 30.1%. GPC analysis with tetrahydrofuran showed a polymer with Mn=894 g/mol and Mw=2743 g/mol, which corresponds to a polydispersity of about 3.1.

Example 15

Copolymerization of Exo-VCA and Methyl Acrylate, 70:30 w/w 250.0 g of 1-methoxy-2-methyl-2-propanol were introduced into a 1 l glass reactor and heated to 120° C. in a nitrogen stream while stirring. To this were added simultaneously, within 2 h, a mixture of 22.4 g of tert-butyl peroctoate and 89.6 g of 1-methoxy-2-methyl-2-propanol and a mixture of 126.0 g of methyl acrylate, 294.0 g of exo-VCA and 100.8 g of 1-methoxy-2-methyl-2-propanol. Once both mixtures had been added, a mixture of 2.0 g of tert-butyl peroctoate and 8.0 g of 1-methoxy-2-methyl-2-propanol was added within 15 min and then the reaction mixture was stirred at 120° C. for 2 h. After cooling to room temperature, the lower, polymer-enriched phase (656.7 g, 55.2%) was concentrated on a rotary evaporator to 443.5 g (81.7%). Subsequently, the reaction mixture was diluted with 74.2 g of dimethyl carbonate, in the course of which the reaction mixture became clear again and the viscosity decreased slightly.

The solids content was 50%. GPC analysis with tetrahydrofuran showed a polymer with Mn=1299 g/mol and Mw=9983 g/mol, which corresponds to a polydispersity of about 7.7.

Use Examples a) Crosslinking of the homopolymer from example 2 and analysis of the mechanical properties and solvent stability of the polymer film

Example 16

Crosslinking at Room Temperature, Solids Content Approx. 20%

To 2 ml of a solution of the homopolymer from example 2 in 1-methoxy-2-propanol having a solids content of approx. 20% was added 0.12 g of pure m-xylylenediamine (MXDA) as a hardener, and the mixture was applied to a phosphated steel sheet at room temperature within a few minutes. After 20 min, the film was dry. After 24 h, the film was tested for its mechanical properties and its solvent stability (see table 1).

Example 17

Crosslinking at 100° C., Solids Content Approx. 20%

To 2 ml of a solution of the homopolymer from example 2 in 1-methoxy-2-propanol having a solids content of approx. 20% was added 0.12 g of pure m-xylylenediamine (MXDA) as a hardener, and the mixture was hardened at 100° C. for 10 min and applied to a phosphated steel sheet. After 20 min, the film was dry. After 24 h, the film was tested for its mechanical properties and its solvent stability (see table 1).

Example 18

Crosslinking at Room Temperature, Solids Content Approx. 80%

The homopolymer from example 2 was used in such an amount that the solids content of the solution was approx. 80%. The hardener, MXDA, was added in the same stoichiometric ratio as in examples 16 and 17, and the polymer was applied to a phosphated steel sheet at room temperature within a few minutes. After 24 h, the film was tested for its mechanical properties and its solvent stability (see table 1).

The determination of pendulum damping (number of impacts) was based on the method of König, described in DIN EN ISO 1522.

The Erichsen cupping was determined to ISO 1520.

The solvent stability was determined to DIN 68861-1.

The cross-cutting was effected to DIN ISO 2409 on bonder sheet.

TABLE 1

Mechanical testing and testing of the solvent stability of the crosslinked homopolymer film

|  | Polymer film according to example 16 | Polymer film according to example 17 | Polymer film according to example 18 |
|---|---|---|---|
| Pendulum damping | 117 | 127 | 120 |
| Erichsen cupping | 3.8 | 3.5 | 2.9 |
| Stability to ethanol/water | 0 | 0 | 4 |
| Stability to ethyl acetate/ethanol | 0 | 0 | 0 |
| Stability to xylene | 0 | 0 | 0 | b) Crosslinking of inventive polymers, optionally with use of different amounts of different catalysts, and examination of the mechanical properties and solvent stability of the polymer films Crosslinking with polyol hardener (general test method):

1.86 g of a copolymer prepared analogously to example 7 (58.6% by weight of n-butyl acetate), 3.9 g of Joncryl® 945 (from BASF SE; polyacrylate polyol, OH number=180, glass transition temperature Tg=17° C., solids content 76% by weight in n-butyl acetate) and the respective catalyst were combined. The feedstocks were mixed until a homogeneous mixture had formed. The mixture was applied rapidly to the respective substrate with an applicator frame. The film hardness was determined by applying the mixture to glass with a 200 µm applicator frame, and the elasticity and solvent stability were determined by applying the mixture to bonder sheet (Gardobond®) with a 150 µm applicator frame. The film applied was flashed off at room temperature for 10 min and then cured in a drying oven at 100° C. or 150° C. for 120 min (curing). The cured films were examined after storage in a climate-controlled room at 20° C. and 42% air humidity for one day.

|  | Example 19 | Example 20 | Example 21 | Example 22 |
|---|---|---|---|---|
| Curing/° C. | 100 | 150 | 100 | 150 |
| Catalyst | DBU | DBU | DBU | DBU |
| Amount of catalyst/g | 0.45 | 0.45 | 0.09 | 0.09 |
| Pot life/min | 10 | 10 | >240 | >240 |
| Pendulum damping | 105 | 128 | 50 | 131 |
| Erichsen cupping | 8.9 | 8.8 | 9.4 | 8.6 |
| Stability to ethyl acetate/ethanol | 1 | 1 | 1 | 5 |
| Cross-cutting (G/T) | 0-1 | 0 | 3 | 2-3 |
| Appearance | smooth, clear | smooth, clear, pale yellow | smooth, clear | smooth, clear, pale yellow |

DBU = 1,8-diazabicyclo[5.4.0]undec-7-ene

|  | Example 23 | Example 24 | Example 25 | Example 26 |
|---|---|---|---|---|
| Curing/° C. | 100 | 150 | 100 | 150 |
| Catalyst | TPP | TPP | TEA | TEA |
| Amount of catalyst/g | 0.9 | 0.9 | 0.9 | 0.9 |
| Pot life/min | >240 | >240 | >240 | >240 |
| Pendulum damping | 26 | 60 | 24 | 72 |
| Erichsen cupping | 9.5 | 9.5 | 8.5 | 9.4 |
| Stability to ethyl acetate/ethanol | 5 | 5 | 5 | 5 |
| Cross-cutting (G/T) | 4-5 | 4-5 | 4-5 | 4-5 |
| Appearance | smooth, clear | smooth, clear, pale yellow | smooth, clear | smooth, clear, pale yellow |

TPP = triphenylphosphine
TEA = triethylamine

Crosslinking with amine hardeners (general test method):

The stated amount of the stated copolymer and the respective amine were combined. The addition of a catalyst was unnecessary. The feedstocks were mixed until a homogeneous mixture had formed. The mixture was applied rapidly to the respective substrate with an applicator frame. The film hardness was determined by applying the mixture to glass with a 200 µm applicator frame, and the elasticity and solvent stability were determined by applying the mixture to bonder sheet (Gardobond®) with a 150 µm applicator frame. The film applied was flashed off at room temperature for 10 min and then cured in a drying oven at 50° C., 60° C., 100° C. or 150° C. for 30 min, or cured at room temperature for 24 h (curing). The cured films were examined after storage in a climate-controlled room at 20° C. and 42% air humidity for one day.

The pot lives were determined with the copolymer prepared in example 7 (38% by weight in n-butyl acetate).

|  | Example 27 | Example 28 | Example 29 | Example 30 |
|---|---|---|---|---|
| Curing/° C. | 22 | 22 | 22 | 50 |
| Amount of copolymer from example 8/g | 4.798 | 4.765 | 4.872 | 4.798 |

-continued

| | | | | |
|---|---|---|---|---|
| Amine | MXDA | IPA | Mixture 1 | MXDA |
| Amount of amine/mg | 152 | 377 | 147 | 152 |
| (amount in relation to 1 mol of carbonate groups) | (50 mol %) | (100 mol %) | (50 mol %) | (50 mol %) |
| Pot life/min | 25 | >60 | 5 | 25 |
| Pendulum damping | 20 | 14 | 18 | 52 |
| Erichsen cupping | 9.5 | 9.5 | 9.5 | 9.5 |
| Stability to ethyl acetate/ethanol | 3 | 3 | 4 | 3 |
| Cross-cutting (G/T) | 0 | 0 | 0 | 0 |
| Appearance | smooth, matt | smooth, matt | smooth, matt | smooth, shiny |

| | Example 31 | Example 32 | Example 33 | Example 34 |
|---|---|---|---|---|
| Curing/° C. | 50 | 50 | 100 | 100 |
| Amount of copolymer from example 5/g | 4.765 | 4.872 | 4.798 | 4.765 |
| Amine | IPA | Mixture 1 | MXDA | IPA |
| Amount of amine/mg | 377 | 147 | 152 | 377 |
| (amount in relation to 1 mol of carbonate groups) | (100 mol %) | (50 mol %) | (50 mol %) | (100 mol %) |
| Pot life/min | >60 | 5 | 25 | >60 |
| Pendulum damping | 97 | 57 | 87 | 174 |
| Erichsen cupping | 9.0 | 9.6 | 9.2 | 1.8 |
| Stability to ethyl acetate/ethanol | 2 | 3 | 3 | 2 |
| Cross-cutting (G/T) | 0 | 0 | 0 | 0 |
| Appearance | smooth, shiny | smooth, shiny | smooth, shiny | smooth, shiny |

| | Example 35 | Example 36 | Example 37 | Example 38 |
|---|---|---|---|---|
| Curing/° C. | 100 | 150 | 150 | 150 |
| Amount of copolymer from example 5/g | 4.872 | 4.798 | 4.765 | 4.872 |
| Amine | Mixture 1 | MXDA | IPA | Mixture 1 |
| Amount of amine/mg | 147 | 152 | 377 | 147 |
| (amount in relation to 1 mol of carbonate groups) | (50 mol %) | (50 mol %) | (100 mol %) | (50 mol %) |
| Pot life/min | 5 | 25 | >60 | 5 |
| Pendulum damping | 106 | 169 | 193 | 151 |
| Erichsen cupping | 9.4 | 8.8 | not determined | 9.1 |
| Stability to ethyl acetate/ethanol | 3 | 3 | 0 | 3 |
| Cross-cutting (G/T) | 0 | 0 | 0 | 0 |
| Appearance | smooth, shiny | smooth, shiny | smooth, shiny | smooth, shiny |

MXDA = m-xylylenediamine
IPA = isophoronediamine
Mixture 1 = mixture of 72.1 mg of diethylenetriamine, 71.4 mg of 2,2-dimethyl-propylenediamine and 119.0 mg of isophoronediamine In example 42, the hardener used was a mixture of amine hardener and polyol hardener. The addition of a catalyst was unnecessary.

| | Example 39 | Example 40 | Example 41 | Example 42 |
|---|---|---|---|---|
| Curing/° C. | 60 | 50 | 100 | 100 |
| Polymer | copolymer analogous to example 7 | from example 4 | exo-VCA homopolymer analogous to example 2, 50% by weight in tetrahydrofuran | from example 8 |
| Amount of polymer/g | 12.52 | 5.01 | 0.985 | 10.24 |
| Polymeric amine | Jeffamine ® D 230 | Jeffamine ® T 403 | IPA | IPA |
| Amount of amine/mg | 1305 | 439 | 92.7 | 830 |
| (amount in relation to 1 mol of carbonate groups) | | (40 mol %) | (50 mol %) | |
| Polyol | — | — | — | Joncryl ® 945 |
| Amount of polyol/g | — | — | — | 3.9 |

-continued

|  | Example 39 | Example 40 | Example 41 | Example 42 |
|---|---|---|---|---|
| Pot life/min | >180 | 15 to 16 | 45 to 135 | 50 |
| Pendulum damping | 63 | 113 | 194 | 167 |
| Erichsen cupping | >9.5 | 8.4 | 0.6 | 6.3 |
| Stability to ethyl acetate/ethanol | not determined | 1 | not determined | 2 |
| Cross-cutting (G/T) | 0 | 0 | 0 | 3 |
| Appearance | shiny | clear | smooth, clear, isolated craters | smooth |

Jeffamine® D 230 is a primary polyetherdiamine which is commercially available from Huntsman and has a molecular weight Mw of about 230, based on about 2.5 polypropylene glycol repeat units. Jeffamine® T 403 is a primary polyethertriamine which is commercially available from Huntsman and has a molecular weight Mw of about 440, based on about 5 to 6 polypropylene glycol repeat units.

c) Crosslinking of the copolymer from example 15 (exo-VCA and methyl acrylate, 70:30 w/w) with different amounts of different amines The stated amount of the copolymer prepared in example 15 in 60% by weight solution in 1-methoxy-2-methyl-2-propanol and the respective amine were combined. The addition of a catalyst was unnecessary. The feedstocks were mixed until a homogeneous mixture had formed. The mixture was applied rapidly to the respective substrate with an applicator frame. The film hardness was determined by applying the mixture to glass with a 200 μm applicator frame, and the elasticity and solvent stability were determined by applying the mixture to bonder sheet (Gardobond®) with a 150 μm applicator frame. The film applied was flashed off at room temperature for 10 min and then cured in a drying oven at 130° C. for 15 min or cured at room temperature for the time stated (curing). If examination of the cured films after storage for several days is specified, the storage was effected in a climate-controlled room at 20° C. and 42% air humidity.

|  | Example 43 | Example 44 | Example 45 | Example 46 |
|---|---|---|---|---|
| Curing/° C. | 130 | 130 | 130 | 130 |
| Amount of copolymer from example 15/g | 8.33 | 8.33 | 8.33 | 8.33 |
| Amine | Dicykan | MXDA | Jeffamine ® D 230 | Jeffamine ® D 230 |
| Amount of amine/g | 1.43 | 0.93 | 3.13 | 1.55 |
| Pot life/min | 15 | ca. 4 | 35 | 40 |
| Pendulum damping | 176.4 | 190.4 | 172.2 | 204.4 |
| Pendulum damping after storage for 3 days | 196 | 204 | 197 | not determined |
| Erichsen cupping | 5 | 4.2 | 7.6 | 7.8 |
| Stability to ethyl acetate/ethanol | 0 | 0 | 4 | 4 |
| Stability to toluene | 0 | 0 | 0 | 0 |
| Cross-cutting (G/T) | 0 | 0 | 0 | 0 |

|  | Example 47 | Example 48 | Example 49 | Example 50 | Example 51 |
|---|---|---|---|---|---|
| Curing/° C. | 22 | 22 | 22 | 22 | 22 |
| Amount of copolymer from example 15/g | 8.33 | 8.33 | 8.33 | 8.33 | 8.33 |
| Amine | Dicykan | MXDA | MXDA | Jeffamine ® D 230 | Jeffamine ® D 230 |
| Amount of amine/g | 1.43 | 1.85 | 0.93 | 3.13 | 1.55 |
| Pot life/min | 15 | 1 | approx. 4 | 35 | 40 |
| Pendulum damping after 2.5 h | not determined | 63 | not determined | not determined | not determined |
| Pendulum damping after storage for 3 days | 119 | 133 | 161 | 30 | 146 |
| Pendulum damping after storage for 7 days | 134 | 125 | 153 | 24 | 155 |
| Erichsen cupping | 4 | 7.8 | 2.3 | 8.4 | 8.1 |
| Stability to ethyl acetate/ethanol | 0 | 5 | 1 | 5 | 4 |
| Stability to toluene | 0 | 3 | 0 | 3 | 0 |
| Cross-cutting (G/T) | 0 | 0 | 0 | 0 | 0 |

Dicykan = 4,4'-diaminodicyclohexylmethane

The invention claimed is:

1. A compound of formula I

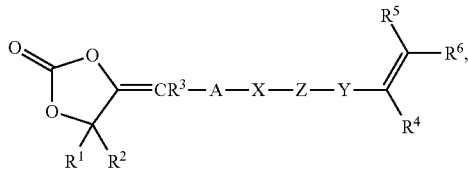

wherein
$R^1$ and $R^2$ are each independently hydrogen, $C_1$-$C_6$-alkyl, $C_1$-$C_4$-alkoxy-$C_1$-$C_4$-alkyl, $C_5$-$C_6$-cycloalkyl, phenyl or phenyl-$C_1$-$C_4$-alkyl;
$R^3$ is hydrogen, $C_1$-$C_6$-alkyl, $C_1$-$C_4$-alkoxy-$C_1$-$C_4$-alkyl, $C_5$-$C_6$-cycloalkyl, phenyl or phenyl-$C_1$-$C_4$-alkyl;
$R^4$ is hydrogen, $C_1$-$C_4$-alkyl, $CH_2COOR^8$, phenyl or phenyl-$C_1$-$C_4$-alkyl;
$R^5$ and $R^6$ are each independently hydrogen or $C_1$-$C_4$-alkyl, or one of $R^5$ and $R^6$ may also be $COOR^8$ or $CH_2COOR^8$;
A is a chemical bond or $C_1$-$C_4$-alkanediyl;
X is O or $NR^7$;
Z is a chemical bond, $PO_2$, $SO_2$ or C=O;
Y is a chemical bond, $CH_2$ or $CHCH_3$;
$R^7$, if present, is $C_1$-$C_6$-alkyl; and
$R^8$, if present, is hydrogen or $C_1$-$C_6$-alkyl.

2. The compound according to claim 1, wherein $R^1$ and $R^2$ are each independently hydrogen or $C_1$-$C_6$-alkyl.

3. The compound according to claim 1, wherein $R^3$ is hydrogen.

4. The compound according to claim 1, wherein A is ethanediyl.

5. The compound according to claim 1, wherein X is O.

6. The compound according to claim 1, wherein Z is C=O.

7. The compound according to claim 1, wherein Y is a chemical bond.

8. A process for preparing the compound according to claim 1, comprising reacting a compound of formula II:

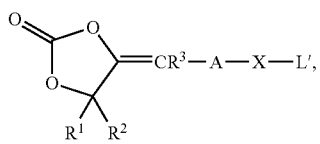

with a compound of formula III:

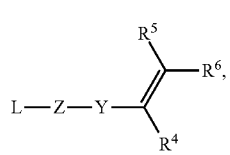

wherein
L is a nucleophilically displaceable leaving group; and
L' is hydrogen or a $C_1$-$C_4$-alkylcarbonyl group.

9. The process according to claim 8,
wherein
L is OH or $C_1$-$C_8$-alkoxy,
Z is CO=, X is O, and
the reacting is performed under conditions of an esterification or transesterification.

10. A polymer having a polymer backbone which is formed from carbon atoms and to which functional groups of the formula I' are attached

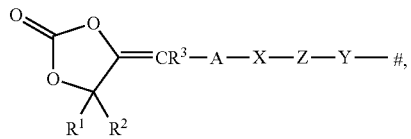

wherein # is a bond to the polymer backbone and
$R^1$ and $R^2$ are each independently hydrogen, $C_1$-$C_6$-alkyl, $C_1$-$C_4$-alkoxy-$C_1$-$C_4$-alkyl, $C_5$-$C_6$-cycloalkyl, phenyl or phenyl-$C_1$-$C_4$-alkyl;
$R^3$ is hydrogen, $C_1$-$C_6$-alkyl, $C_1$-$C_4$-alkoxy-$C_1$-$C_4$-alkyl, $C_5$-$C_6$-cycloalkyl, phenyl or phenyl-$C_1$-$C_4$-alkyl;
A is a chemical bond or $C_1$-$C_4$-alkanediyl;
X is O or $NR^7$;
Z is a chemical bond, PO, $SO_2$ or C=O;
Y is a chemical bond, $CH_2$ or $CHCH_3$; and
$R^7$, if present, is $C_1$-$C_6$-alkyl.

11. A polymer formed from polymerized ethylenically unsaturated compounds M, wherein the compounds M comprise at least 1% by weight, based on a total amount of the ethylenically unsaturated compounds forming the polymer, of the compound according to claim 1.

12. The polymer according to claim 10, in a form of a homopolymer of a compound of formula I.

13. The polymer according to claim 10, comprising from 1 to 99% by weight of a compound of formula I and of from 1 to 99% by weight of a monoethylenically unsaturated comonomer b, a conjugatedly diethylenically unsaturated comonomer b, or both, in copolymerized form.

14. The polymer according to claim 13, wherein the comonomer b is at least one selected from the group consisting of
monoethylenically unsaturated $C_3$-$C_8$-monocarboxylic acid, monoethylenically unsaturated $C_4$-$C_8$-dicarboxylic acid,
amides an amide of monoethylenically unsaturated $C_3$-$C_8$-mono- or $C_4$-$C_8$-dicarboxylic acids,
an anhydride of monoethylenically unsaturated $C_4$-$C_8$-dicarboxylic acids,
a hydroxy-$C_2$-$C_4$-alkyl ester of monoethylenically unsaturated $C_3$-$C_8$-mono- or $C_4$-$C_8$-dicarboxylic acids,
a monoethylenically unsaturated sulfonic acid or a salt thereof,
a monoethylenically unsaturated nitrile having 3 to 5 carbon atoms, a N-vinylheterocycle,
a monoethylenically unsaturated compound having a poly-$C_2$-$C_4$-alkylene oxide group,
a vinylaromatic hydrocarbon,
esters an ester of monoethylenically unsaturated $C_3$-$C_8$-monocarboxylic acids with $C_1$-$C_{20}$-alkanols, $C_5$-$C_6$-cycloalkanols, phenyl-$C_1$-$C_4$-alkanols or phenoxy-$C_1$-$C_4$-alkanols, a diester of monoethylenically unsaturated $C_4$-$C_8$-dicarboxylic acids with $C_1$-$C_{20}$-alkanols, $C_5$-$C_8$-cycloalkanols, phenyl-$C_1$-$C_4$-alkanols or phenoxy-$C_1$-$C_4$-alkanols, a $C_1$-$C_{20}$-alkylamide of monoethylenically unsaturated $C_3$-$C_8$-monocarboxylic acids, a di-$C_1$-$C_{10}$-alkylamide of monoethylenically unsaturated $C_3$-$C_8$-monocarboxylic acids, a vinyl ester of aliphatic carboxylic acids having 1 to 20 carbon atoms, a conjugatedly diethylenically unsaturated $C_4$-$C_{10}$-olefin, a $C_2$-$C_{20}$-olefin, a halogen-substituted $C_2$-$C_{20}$-olefin, a monoethylenically unsaturated monomer having one or two epoxide groups, a monoethylenically unsaturated monomer having a carbonate group, an ester of monoethylenically unsaturated $C_3$-$C_8$-monocarboxylic acids with $C_8$-$C_{24}$-alkenols or $C_8$-$C_{24}$-alkanedienols and an ester of monoethylenically unsaturated dicarboxylic acids with $C_8$-$C_{24}$-alkenols or $C_8$-$C_{24}$-alkane-dienols.

15. The polymer according to claim 13, further comprising, in copolymerized form, a comonomer c having 2, 3 or 4 nonconjugated, ethylenically unsaturated double bonds.

16. The polymer according to claim 10, wherein the polymer is a component in 2K binder compositions.

17. The polymer according to claim 16, wherein the binder composition comprises one a compound having at least two functional groups F selected from the group consisting of an aliphatic hydroxyl group, a primary amino group, a secondary amino group, a phosphine group, a phosphonate group and a mercaptan group.

18. The polymer according to claim 17, wherein a molar ratio of functional groups of the formula I' to the functional groups F is from 1:10 to 10:1.

19. The compound according to claim 1, wherein $R_1$ and $R_2$ are each independently hydrogen or methyl.

* * * * *